(12) United States Patent
Ushio et al.

(10) Patent No.: US 10,417,329 B2
(45) Date of Patent: Sep. 17, 2019

(54) DIALOGUE ACT ESTIMATION WITH LEARNING MODEL

(71) Applicant: Panasonic Intellectual Property Management Co., Ltd., Osaka (JP)

(72) Inventors: Takashi Ushio, Tokyo (JP); Hongjie Shi, Tokyo (JP); Mitsuru Endo, Tokyo (JP); Katsuyoshi Yamagami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 178 days.

(21) Appl. No.: 15/665,951

(22) Filed: Aug. 1, 2017

(65) Prior Publication Data

US 2018/0046614 A1 Feb. 15, 2018

Related U.S. Application Data

(60) Provisional application No. 62/372,443, filed on Aug. 9, 2016.

(30) Foreign Application Priority Data

Mar. 31, 2017 (JP) ................................. 2017-071334

(51) Int. Cl.
*G10L 15/16* (2006.01)
*G10L 17/04* (2013.01)
(Continued)

(52) U.S. Cl.
CPC ........ *G06F 17/2755* (2013.01); *G06F 17/279* (2013.01); *G06F 17/2785* (2013.01);
(Continued)

(58) Field of Classification Search
CPC ......... G10L 15/06; G10L 15/16; G10L 15/18; G10L 15/1822; G10L 15/22; G10L 17/04; G06N 3/0454
(Continued)

(56) References Cited

U.S. PATENT DOCUMENTS 9,489,942 B2 * 11/2016 Lee ..................... G10L 15/1822
9,741,336 B2 * 8/2017 Williams .............. G10L 15/063
(Continued)

OTHER PUBLICATIONS

Nal Kalchbrenner et al., "Recurrent Convolutional Neural Networks for Discourse Compositionality", arXiv preprint arXiv:1306.3584, Jun. 15, 2013.
(Continued)

*Primary Examiner* — Martin Lerner
(74) *Attorney, Agent, or Firm* — Greenblum & Bernstein, P.L.C.

(57) ABSTRACT

A dialog act estimation method includes acquiring learning data including a first sentence to be estimated in the form of text data of a first uttered sentence uttered at a first time point, a second sentence which is text data of a second uttered sentence uttered, at a time point before the first time point, successively after the first uttered sentence, act information indicating an act associated to the first sentence, property information indicating a property information associated to the first sentence, and dialog act information indicating a dialog act in the form of a combination of an act and a property associated to the first sentence, making a particular model learn three or more tasks at the same time using the learning data, and storing a result of the learning as learning result information in a memory.

11 Claims, 17 Drawing Sheets

| | DIALOGUE ID (143) | TIME POINT (144) | DIALOGUE ACT (145) | ACT (146) | PROPERTY (147) | SPEAKER IDENTIFICATION (148) | SENTENCE (149) |
|---|---|---|---|---|---|---|---|
| 142 | 243 | 0 | INI (RECOMMEND) | INI | RECOMMEND | Guide | Let's try okay? |
| | 243 | 1 | FOL (ACK) | FOL | ACK | Tourist | Okay. |
| | 243 | 2 | INI (RECOMMEND) FOL (INFO\|HOW_MUCH) | INI FOL | RECOMMEND INFO HOW_MUCH | Guide | It's InnCrowd Backpackers Hostel in Singapore. If you take a dorm bed per person only twenty dollars. If you take a room, it's two single beds at fifty nine dollars. |
| | 243 | 3 | FOL (POSITIVE) | FOL | POSITIVE | Tourist | Um. Wow, that's good. |
| | 243 | 4 | FOL (INFO\|HOW_MUCH) | FOL | INFO HOW_MUCH | Guide | Yah, prices are based on per person per bed or dorm. But this one is room. So it should be fifty nine for the two room. Soyou're actually paying about ten dollars more per person only. |
| | 243 | 5 | FOL (ACK) FOL (POSITIVE) | FOL | ACK, POSITIVE | Tourist | Oh okay. That's-the price is reasonable actually. It's good. |
| 1011 | ... | ... | ... | ... | | | ... |

(51) Int. Cl.
*G06F 17/27* (2006.01)
*G06N 20/00* (2019.01)
*G06N 3/04* (2006.01)
*G10L 21/0272* (2013.01)
*G10L 15/18* (2013.01)

(52) U.S. Cl.
CPC ......... *G06N 3/0445* (2013.01); *G06N 3/0454* (2013.01); *G06N 20/00* (2019.01); *G10L 15/1822* (2013.01); *G10L 21/0272* (2013.01); *G10L 17/04* (2013.01)

(58) Field of Classification Search
USPC .................. 704/232, 243, 255, 257, 270
See application file for complete search history.

(56) References Cited

U.S. PATENT DOCUMENTS

| | | | | |
|---|---|---|---|---|
| 2015/0379984 | A1* | 12/2015 | Stent | G10L 15/183 704/240 |
| 2016/0155439 | A1* | 6/2016 | Bangalore | G10L 15/1822 704/257 |
| 2017/0372694 | A1* | 12/2017 | Ushio | G10L 21/0272 |
| 2018/0005333 | A1* | 1/2018 | Endo | G16H 50/20 |
| 2018/0159806 | A1* | 6/2018 | Endo | G06F 16/3338 |
| 2018/0366120 | A1* | 12/2018 | Ushio | G10L 15/063 |
| 2019/0129932 | A1* | 5/2019 | Sakai | G06F 17/278 |

OTHER PUBLICATIONS

The Extended European Search Report dated Jan. 4, 2018 for the related European Patent Application No. 17183949.1.

Guo Daniel et al: "Joint semantic utterance classification and slot filling with recursive neural networks", 2014 IEEE Spoken Language Technology Workshop (SLT), IEEE, Dec. 7, 2014 (Dec. 7, 2014), pp. 554-559, XP032756955.

Ushio Takashi et al: "Recurrent convolutional neural networks for structured speech act tagging", 2016 IEEE Spoken Language Technology Workshop (SLT), IEEE, Dec. 13, 2016 (Dec. 13, 2016), pp. 518-524, XP033061787.

* cited by examiner

FIG. 3

| DIALOGUE ID | TIME POINT | DIALOGUE ACT | ACT | PROPERTY | SPEAKER IDENTIFICATION | SENTENCE |
|---|---|---|---|---|---|---|
| 243 | 0 | INI (RECOMMEND) | INI | RECOMMEND | Guide | Let's try okay? |
| 243 | 1 | FOL (ACK) | FOL | ACK | Tourist | Okay. |
| 243 | 2 | INI (RECOMMEND) FOL (INFO\|HOW_MUCH) | INI FOL | RECOMMEND INFO HOW_MUCH | Guide | It's InnCrowd Backpackers Hostel in Singapore. If you take a dorm bed per person only twenty dollars. If you take a room, it's two single beds at fifty nine dollars. |
| 243 | 3 | FOL (POSITIVE) | FOL | POSITIVE | Tourist | Um. Wow, that's good. |
| 243 | 4 | FOL (INFO\|HOW_MUCH) | FOL | INFO HOW_MUCH | Guide | Yah, prices are based on per person per bed or per person per bed or dorm. But this one is room. So it should be fifty nine for the two room. Soyou're actually paying about ten dollars more per person only. |
| 243 | 5 | FOL (ACK) FOL (POSITIVE) | FOL | ACK, POSITIVE | Tourist | Oh okay. That's-the price is reasonable actually. It's good. |
| ... | | ... | ... | | | ... |

FIG. 6

| TIME POINT | SPEAKER IDENTIFICATION | UTTERED SENTENCE |
|---|---|---|
| 0 | Guide | %Uh and prices are also affordable so you can buy more, you know more variety. |
| 1 | Tourist | %Um okay. |
| 2 | Tourist | I see. |
| 3 | Tourist | So how do I get there from %Uh maybe from the hotel or from-maybe from Raffles Centre? |
| 4 | Guide | %Uh you can take the train from City Hall Station. |

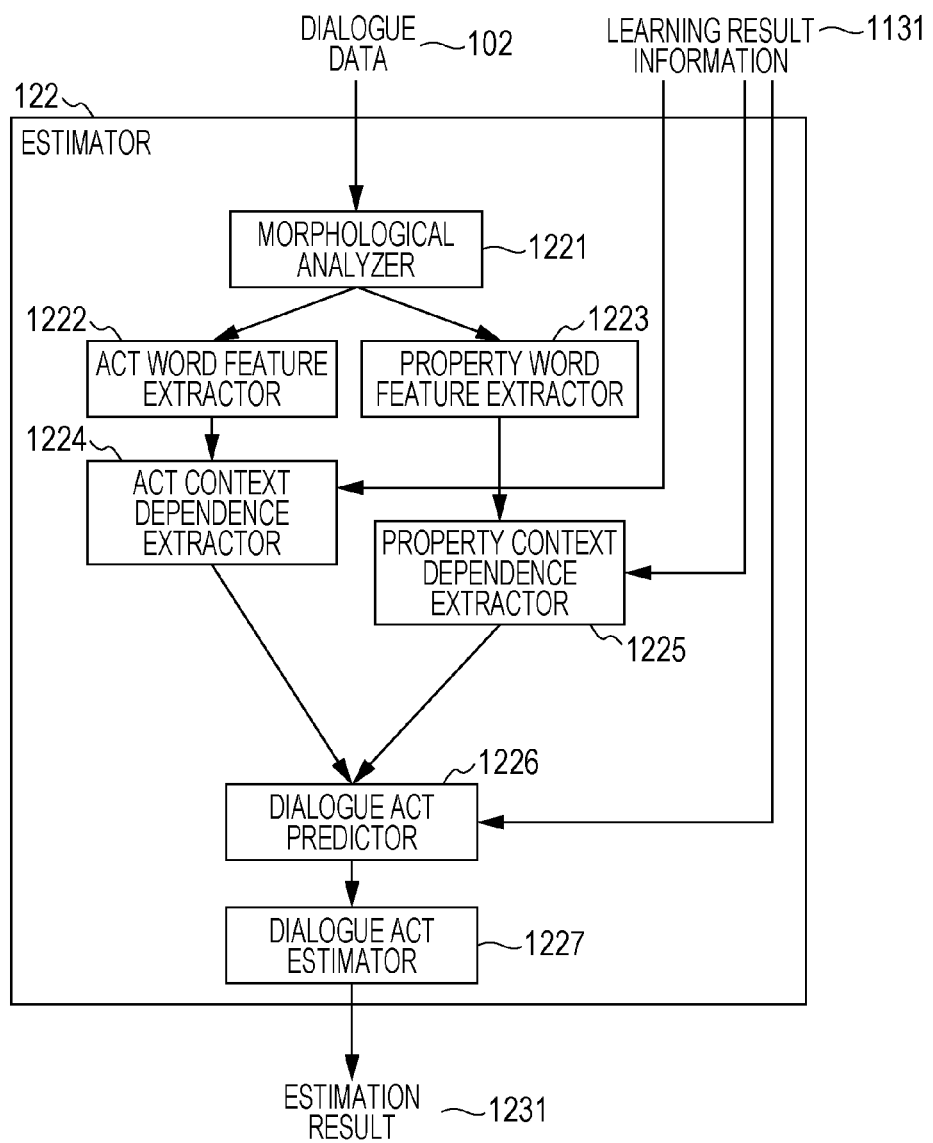

FIG. 8

| TIME POINT | SPEAKER IDENTIFICATION | UTTERED SENTENCE | ESTIMATED DIALOGUE ACT |
|---|---|---|---|
| 0 | Guide | %Uh and prices are also affordable so you can buy more, you know more variety. | FOL_INFO |
| 1 | Tourist | %Um okay. | FOL_ACK |
| 2 | Tourist | I see. | FOL_INFO |
| 3 | Tourist | So how do I get there from %Uh maybe from the hotel or from-maybe from Raffles Centre? | QST_INFO |
| 4 | Guide | %Uh you can take the train from City Hall Station. | RES_INFO |

FIG. 12

| SLU | Speech Act GUIDE | | | Speech Act TOURIST | | |
|---|---|---|---|---|---|---|
| Model | Precision | Recall | F1 | Precision | Recall | F1 |
| COMPARATIVE EXAMPLE | 0.745 | 0.594 | 0.661 | 0.473 | 0.516 | 0.493 |
| FIRST EMBODIMENT | 0.758 | 0.614 | 0.678 | 0.487 | 0.526 | 0.506 |

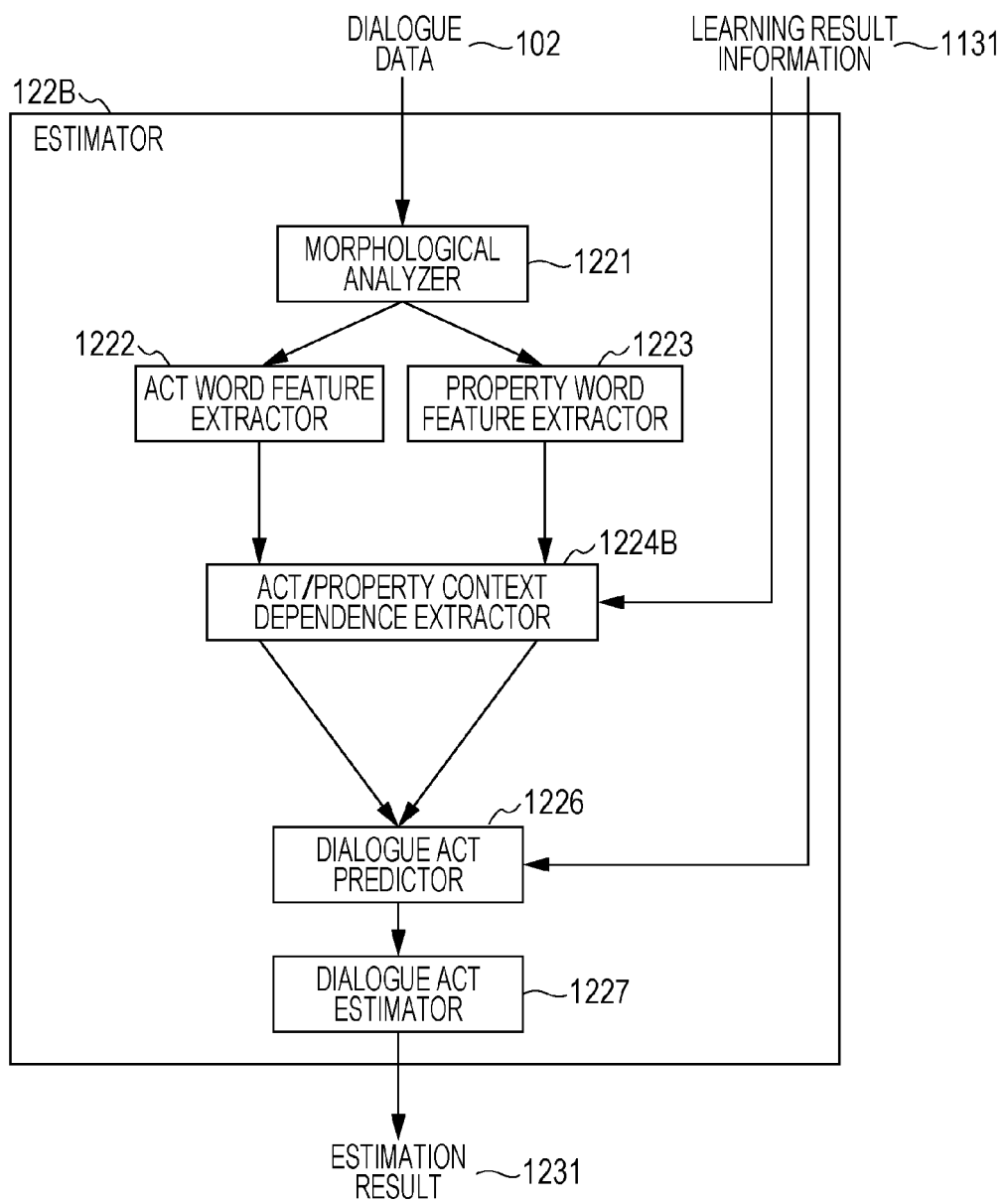

DIALOGUE ACT ESTIMATION WITH LEARNING MODEL

BACKGROUND

1. Technical Field

The present disclosure relates to a method, an apparatus, and a medium, capable of providing an improved accuracy in estimating a dialogue act. More specifically, the present disclosure relates to, for example, a dialogue act estimation method, a dialogue act estimation apparatus, and a medium, and particularly to a dialogue act estimation method, a dialogue act estimation apparatus, and a medium, for estimating a dialogue act meant by an uttered sentence using a particular model subjected to machine learning.

2. Description of the Related Art

A dialogue act estimation technique is a technique for estimating a dialogue act meant by an utterance of a user. A technique proposed for such a purpose is to learn a language feature of a word or phrase having a high occurrence frequency and contributing to a dialogue act by using a corpus in which dialogue acts are defined for utterances on an utterance-by-utterance basis. It has also been proposed to use a neural network to learn a dialogue act dependent on a context based on context information associated with a previous utterance (see, for example, Nal Kalchbrenner, Phil Blunsom, "Recurrent Convolutional Neural Networks for Discourse Compositionality", arXiv preprint arXiv: 1306.3584, 2013). In a technique disclosed in Nal Kalchbrenner, Phil Blunsom, "Recurrent Convolutional Neural Networks for Discourse Compositionality", arXiv preprint arXiv: 1306.3584, 2013, a dialogue act dependent on a context and a language feature is learned using a recurrent neural network capable of treating time-series information.

SUMMARY

However, in the technique disclosed in Nal Kalchbrenner, Phil Blunsom, "Recurrent Convolutional Neural Networks for Discourse Compositionality", arXiv preprint arXiv: 1306.3584, 2013, there is a problem that a sufficiently large amount of training data is not provided in a learning process and thus it is difficult to achieve a high enough accuracy.

One non-limiting and exemplary embodiment provides a dialogue act estimation method, a dialogue act estimation apparatus, and a medium, capable of providing an improved accuracy in estimating a dialogue act.

In one general aspect, the techniques disclosed here feature a dialogue act estimation method including acquiring learning data including a first sentence to be estimated in the form of text data of a first uttered sentence uttered at a first time point, a second sentence in the form of text data of a second uttered sentence successively following the first uttered sentence, the second uttered sentence being uttered at a time point before the first time point, act information associated to the first sentence, property information associated to the first sentence, and dialogue act information indicating a dialogue act which is a combination of an act and a property associated to the first sentence, making a particular model learn three or more tasks at the same time using the learning data, and storing a result of the learning as learning result information in a memory. In the making, the particular model is made to learn, as one of the tasks, an association between the first uttered sentence and the act information using, as training data, the act information included in the learning data. In the making, the particular model is made to learn, as one of the tasks, an association between the first uttered sentence and the property information using, as training data, the property information included in the learning data. In the making, the particular model is made to learn, as one of the tasks, an association between the first uttered sentence and the dialogue act information using, as training data, the dialogue act information included in the learning data.

The dialogue act estimation method according to the present disclosure is capable of providing an improved accuracy in estimating a dialogue act.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating an example of dialogue data according to the first embodiment;

FIG. 6 is a diagram illustrating an example of dialogue data according to the first embodiment;

FIG. 7 is a block diagram illustrating an example of a configuration of a dialogue act estimator according to the first embodiment;

FIG. 8 is a diagram illustrating an example of a result of an estimation performed by a dialogue act estimation apparatus according to the first embodiment;

FIG. 12 is a diagram illustrating an effect achieved by a dialogue act estimation method according to the first embodiment;

FIG. 15 is a block diagram illustrating an example of a detailed configuration of an estimator according to a modification of the first embodiment;

DETAILED DESCRIPTION

Figure 1:
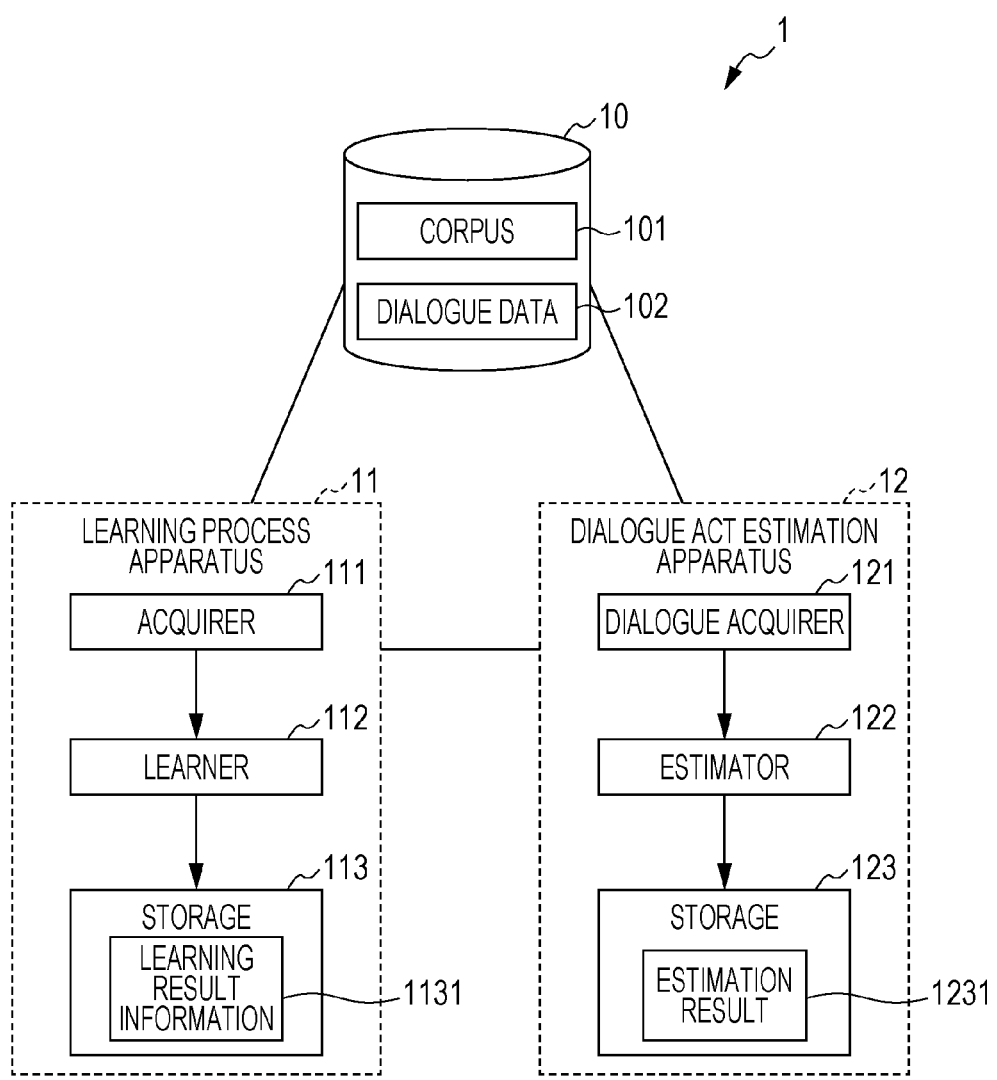
FIG. 1 is a block diagram illustrating an example of a configuration of a dialogue act estimation system according to a first embodiment.

Underlying Knowledge Forming Basis of the Present Disclosure

In Nal Kalchbrenner, Phil Blunsom, "Recurrent Convolutional Neural Networks for Discourse Compositionality", arXiv preprint arXiv: 1306.3584, 2013, there is a description about a problem due to non-use of important context information included in dialogue data of successive utterances. To solve this problem, it is proposed to use a model in which speakers are distinguished and feature values of successive utterances in the dialogue data are detected for each speaker, and learning is performed using a recurrent neural network, which is a time-series model, to extract context dependence while distinguishing between utterances of a speaker and utterances of another speaker.

However, in the technique disclosed in Nal Kalchbrenner, Phil Blunsom, "Recurrent Convolutional Neural Networks for Discourse Compositionality", arXiv preprint arXiv: 1306.3584, 2013, it is assumed that a single semantic concept is output, and no other semantic concepts are used.

Therefore, in the method disclosed in Nal Kalchbrenner, Phil Blunsom, "Recurrent Convolutional Neural Networks for Discourse Compositionality", arXiv preprint arXiv: 1306.3584, 2013, the amount of training data used in learning is not sufficient, and thus it is difficult to achieve a sufficiently high estimation accuracy.

In view of the problem described above, one non-limiting and exemplary embodiment provides a dialogue act estimation method, a dialogue act estimation apparatus, and a medium, capable of providing an improved accuracy in estimating a dialogue act.

In as aspect, the present disclosure provides a dialogue act estimation method including acquiring learning data including a first sentence to be estimated in the form of text data of a first uttered sentence uttered at a first time point, a second sentence in the form of text data of a second uttered sentence successively following the first uttered sentence, the second uttered sentence being uttered at a time point before the first time point, act information associated to the first sentence, property information associated to the first sentence, and dialogue act information indicating a dialogue act which is a combination of an act and a property associated to the first sentence, making a particular model learn three or more tasks at the same time using the learning data, and storing a result of the learning as learning result information in a memory. In the making, the particular model is made to learn, as one of the tasks, an association between the first uttered sentence and the act information using, as training data, the act information included in the learning data. In the making, the particular model is made to learn, as one of the tasks, an association between the first uttered sentence and the property information using, as training data, the property information included in the learning data. In the making, the particular model is made to learn, as one of the tasks, an association between the first uttered sentence and the dialogue act information using, as training data, the dialogue act information included in the learning data.

In this aspect, a dialogue act intended by an uttered sentence of interest uttered at a first time point is subjected to multi-task learning using act information and property information of the uttered sentence and dialogue act information that is a combination of act information and property information of the uttered sentence. This allows an increase in accuracy in associating an uttered sentence with dialogue act information.

The learning data may further include first speaker identification information indicating a speaker of the first sentence and second speaker identification information indicating a speaker of the second sentence.

In the present aspect, a further improvement in accuracy in associating an uttered sentence with dialogue act information is possible by performing learning using speaker identification information indicating a speaker of each sentence of a plurality of uttered sentences.

For example, the particular model may include a first model that outputs a first feature vector representing a word feature associated with an act meant by the first sentence and representing context information associated with the word feature based on the first sentence, the second sentence, the first speaker identification information, the second speaker identification information, and a first weight parameter, a second model that outputs a second feature vector representing a word feature associated with a property indicated by the first sentence and representing context information associated with the word feature based on the first sentence, the second sentence, the first speaker identification information, the second speaker identification information, and a second weight parameter, a third model that outputs a posterior probability of the act corresponding to the first sentence based on the first feature vector and a third weight parameter, a fourth model that outputs a posterior probability of the property corresponding to the first sentence based on the second feature vector and a fourth weight parameter, and a fifth model that outputs a posterior probability of the dialogue act corresponding to the first sentence based on the first feature vector, the second feature vector and a fifth weight parameter. In the making, based on errors of the posterior probability of the act corresponding to the first sentence, the posterior probability of the property corresponding to the first sentence, and the posterior probability of the dialogue act corresponding to the first sentence relative to the dialogue act information, the act information, and the property information included in the learning data, updating using an error backpropagation method may be performed in terms of the first weight parameter, the second weight parameter, the third weight parameter, the fourth weight parameter, and the fifth weight parameter, and the particular model may be made to learn the three or more tasks at the same time using the learning data.

For example, the first model may include an RNN-LSTM (Recurrent Neural Network-Long Short Term Memory) having the first weight parameter dependent on the first speaker identification information and the second speaker identification information, and the second model may include a second RNN-LSTM having the second weight parameter dependent on the first speaker identification information and the second speaker identification information.

For example, the particular model may include a first model that outputs a feature vector representing a word feature associated with an act and a property indicated by the first sentence and representing context information associated with the word feature based on the first sentence, the second sentence, the first speaker identification information, the second speaker identification information, and a first weight parameter, a third model that outputs a posterior probability of the act corresponding to the first sentence based on the feature vector and a third weight, a fourth model that outputs a posterior probability of the property corresponding to the first sentence based on the feature vector and a fourth weight, and a fifth model that outputs a posterior probability of the dialogue act corresponding to the first sentence based on the feature vector and a fifth weight. In the making based on errors of the posterior probability of the act corresponding to the first sentence, the posterior probability of the property corresponding to the first sentence, and the posterior probability of the dialogue act corresponding to the first sentence relative to the dialogue act information, the act information, and the property information included in the learning data, updating of the first weight parameter, the third weight parameter, the fourth weight parameter, and the fifth weight parameter may be performed using an error backpropagation method, and the particular model may be made to learn the three or more tasks at the same time using the learning data.

For example, the first model may include an RNN-LSTM having the first weight parameter dependent on the first speaker identification information and the second speaker identification information.

For example, the learning data may be acquired from a corpus including a collection of two or more successive time-series uttered sentences each associated with act information, property information, and dialogue act information.

For example, the dialogue act estimation method may further include acquiring dialogue data including a third sentence in the form of text data of a third uttered sentence uttered at a second time point by a user, a fourth sentence in the form of text data of a fourth uttered sentence uttered at a time point immediately before the second time point, third speaker identification information indicating a speaker of the third sentence, and fourth speaker identification information indicating a speaker of the fourth sentence, and estimating a dialogue act for the third uttered sentence by applying the dialogue data to the model in which the stored learning result information has been reflected.

In this method, a dialogue act can be estimated from an uttered sentence using a learning result. For example, at least one of the acquiring, the making and the storing may be performed by a processor.

In as aspect, the present disclosure provides a dialogue act estimation apparatus including an acquirer that acquires learning data including a first sentence to be estimated in the form of text data of a first uttered sentence uttered at a first time point, a second sentence in the form of text data of a second uttered sentence successively following the first uttered sentence, the second uttered sentence being uttered at a time point before the first time point, act information associated to the first sentence, property information associated to the first sentence, and dialogue act information indicating a dialogue act which is a combination of an act and a property associated to the first sentence, a learner that makes a particular model learn three or more tasks at the same time using the learning data, and a storage that stores a result of the learning as learning result information. The learner makes the particular model learn tasks such that one of the tasks including learning an association between the first uttered sentence and the act information using, as training data, the act information included in the learning data, one of the tasks including learning an association between the first uttered sentence and the property information using, as training data, the property information included in the learning data, and one of the tasks includes learning an association between the first uttered sentence and the dialogue act information using, as training data, the dialogue act information included in the learning data. For example, at least one of the acquirer, the learner and the storage may include a processor.

In an aspect, the present disclosure provides a non-transitory computer-readable recording medium storing a program that causes a computer to execute the dialogue act estimation method described above.

These general or specific embodiments may be implemented as a system, a method, an integrated circuit, a computer program, or a computer-readable storage medium such as a CD-ROM disk, or as an arbitrary combination of a system, a method, an integrated circuit, a computer program, and a storage medium.

Embodiments of the present disclosure are described below with reference to drawings. Note that each embodiment described below is for illustrating a specific example of an implementation of a dialogue act estimation method, a dialogue act estimation apparatus, or a program of the present disclosure. That is, in the following embodiments of the present disclosure, values, shapes, constituent elements, steps, the order of steps, and the like are described by way of example but not limitation. Among constituent elements described in the following embodiments, those constituent elements that are not described in independent claims indicating highest-level concepts of the present disclosure are optional. Also note that various combinations of part or all of embodiments are possible.

First Embodiment

A dialogue act estimation method and related techniques according to a first embodiment are described below with reference to drawings.

Dialogue Act Estimation System

Figure 2:
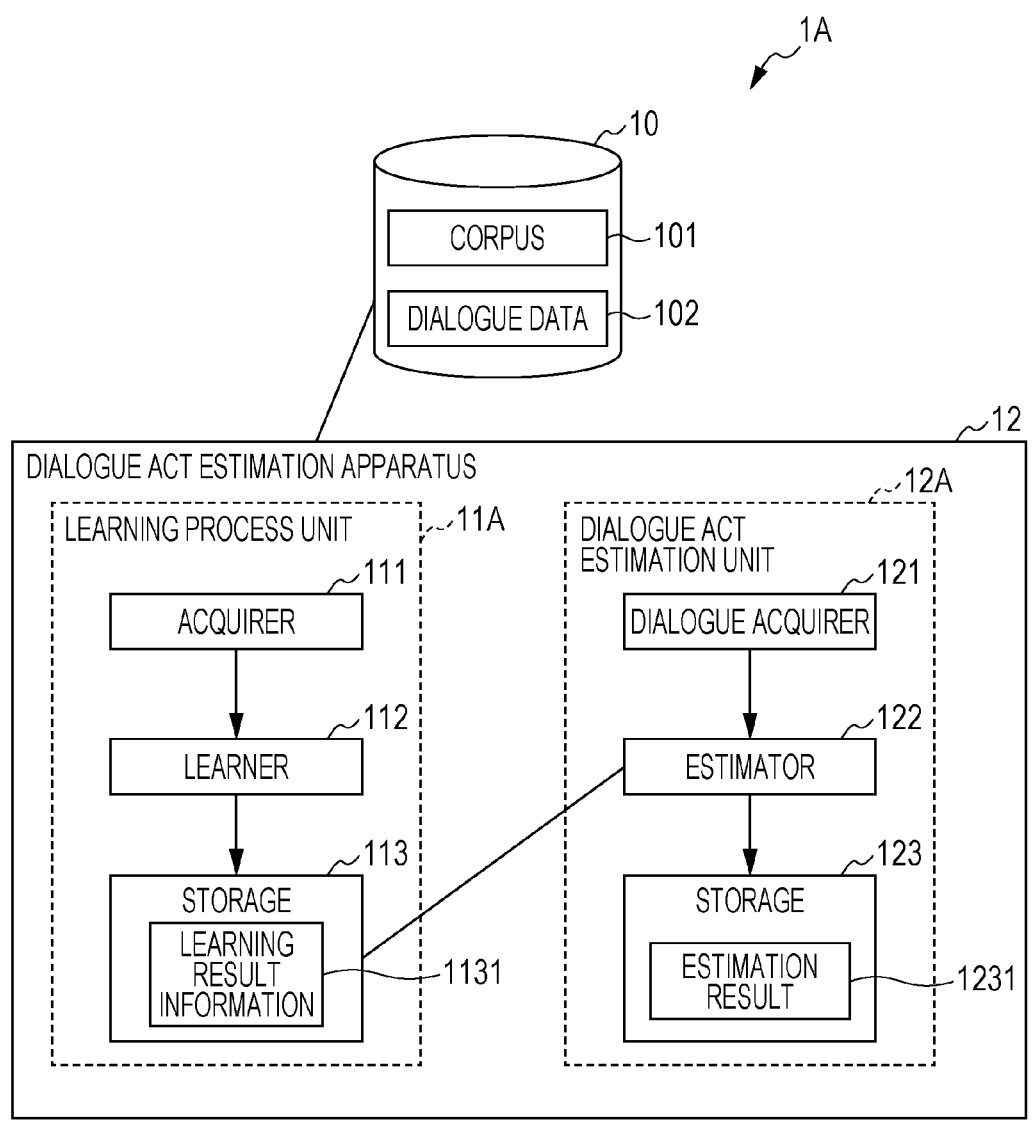
FIG. 2 is a block diagram illustrating another example of a configuration of a dialogue act estimation system according to the first embodiment.

FIG. 1 is a block diagram illustrating an example of a configuration of a dialogue act estimation system 1 according to the first embodiment. FIG. 2 is a block diagram illustrating another example of a configuration of a dialogue act estimation system according to the first embodiment. In FIG. 2, similar elements to those shown in FIG. 1 are denoted by similar reference numerals.

The dialogue act estimation system 1 shown in FIG. 1 includes a storage apparatus 10, a learning process apparatus 11, and a dialogue act estimation apparatus 12. In the example shown in FIG. 1, the dialogue act estimation apparatus of the present disclosure includes the learning process apparatus 11 and the dialogue act estimation apparatus 12.

Storage Apparatus 10

The storage apparatus 10 stores a corpus 101 and dialogue data 102. The corpus 101 includes data of a collection of uttered sentences in the form of text data each associated with a dialogue act. Each dialogue act indicates a type of an intention of an utterance performed by a user. In the present embodiment, the corpus 101 includes a plurality of pieces of learning data 1011. The learning data 1011 is learning data used by the learning process apparatus 11 in performing a learning process.

The storage apparatus 10 may be realized using a rewritable non-volatile memory such as a hard disk drive, a solid state drive, or the like.

Learning Process Apparatus 11

The learning process apparatus 11 acquires one or more pieces of learning data 1011 from the corpus 101 stored in the storage apparatus 10, and performs multi-task learning in which the particular model used for estimating a dialogue act meant by an uttered sentence is made to learn three or more tasks at the same time. The learning process apparatus 11 may be realized using a computer or the like. In the present embodiment, it is assumed by way of example that the particular model is a neural network model including two recurrent neural networks subjected to machine learning. However, the particular model may be a probability model including CRF (Conditional Random Fields) or the like, Dialogue Act Estimation Apparatus 12

The dialogue act estimation apparatus 12 acquires dialogue data 102 from the storage apparatus 10 and estimates a dialogue act meant by an uttered sentence included in the dialogue data 102 by using the particular model having been subjected to the multi-task learning by machine learning performed by the learning process apparatus 11. The dialogue act estimation apparatus 12 may be realized using a computer or the like.

The configuration of the dialogue act estimation system 1 according to the first embodiment is not limited to that shown in FIG. 1. For example, as with a dialogue act estimation system 1A shown in FIG. 2, the dialogue act estimation apparatus 12 may include a learning process unit 11A serving as a functional unit corresponding to the learning process apparatus 11 shown in FIG. 1 and a dialogue act estimation unit 12A serving as a functional unit corresponding to the dialogue act estimation apparatus 12 shown in FIG. 1. In the example shown in FIG. 2, the dialogue act estimation apparatus of the present disclosure corresponds to the dialogue act estimation apparatus 12. That is, a learning process and a dialogue act estimation process may be performed by a single apparatus as with the dialogue act estimation apparatus 12 shown in FIG. 2, or the learning process and the dialogue act estimation process may be performed by different apparatuses as with the learning process apparatus 11 and the dialogue act estimation apparatus 12 shown in FIG. 1. The dialogue act estimation apparatus 12 shown in FIG. 2 may further include the storage apparatus 10.

Details of the configuration of the learning process apparatus 11 and the dialogue act estimation apparatus 12 are described below.

Learning Process Apparatus 11

As shown in FIG. 1 or elsewhere, the learning process apparatus 11 includes an acquirer 111, a learner 112, and a storage 113.

Storage 113

The storage 113 stores a result of the learning performed by the learner 112 as learning result information 1131. The storage 113 may be realized, for example, by a rewritable non-transitory memory such as a hard disk drive, a solid state drive, or the like.

Acquirer 111

The acquirer 111 acquires learning data including a first sentence which is a sentence to be learned and which is text data of a first uttered sentence at a first time, a second sentence in the form of text data of a second uttered sentence successively following the first uttered sentence, the second uttered sentence being uttered at a time point before the first time point, act information indicating an act associated to the first sentence, property information indicating a property information associated to the first sentence, and dialogue act information indicating a dialogue act which is a combination of an act and a property associated to the first sentence. Note that the learning data may further include first speaker identification information indicating a speaker of the first sentence and second speaker identification information indicating a speaker of the second sentence. In the acquisition, the acquirer 111 acquires the learning data from a corpus including a collection of two or more successive time-series uttered sentences each associated with act information, property information, and dialogue act information.

In the present embodiment, the acquirer 111 acquires one or more pieces of learning data 1011 from the corpus 101 stored in the storage apparatus 10. Note that the acquirer 111 may include, for example, a processor such as a CPU, an ASIC, an FPGA, or the like and the function of the acquisition unit 111 may be realized by executing, by the processor such as a CPU, a computer-readable program stored in a computer.

FIG. 3 is a diagram illustrating an example of learning data 1011 according to the first embodiment. As described above, the learning data 1011 shown in FIG. 3 is included in the corpus 101. In other words, the corpus 101 is a collection of two or more pieces of learning data 1011.

The learning data 1011 includes data of a plurality of uttered sentences uttered successively in time series. In the example shown in FIG. 3, the learning data 1011 includes data of a set of uttered sentences of a dialogue spoken in English in terms of tourist information.

The learning data 1011 includes, as shown in FIG. 3, a sentence 149 associated with a dialogue ID 143, time information 144, dialogue act information 145, act information 146, property information 147, and speaker identification information 148. The learning data 1011 includes training data 142 including one or more sentences 149 each associated with a dialogue ID 143, . . . , and speaker identification information 148. In the example shown in FIG. 3, the training data 142 includes, by way of example but not limitation, two sentences 149 to each of which a dialogue ID 143, . . . , and speaker identification information 148 are associated.

The sentence 149 is text data of one uttered sentence representing one sentence of one utterance. As shown in FIG. 3, the sentence 149 is English character string data in which words are separated by a space. In a case where the sentence 149 is Japanese character string data, the sentence 149 may include no word delimiters.

The dialogue ID 143 is an identifier for uniquely identifying a piece of learning data 1011. The time information 144 indicates a time point of the sentence 149 by which an utterance order is indicated. That is, the time information 144 indicates the order in which plurality of sentences 149 in the learning data 1011 are uttered. A start and an end of a dialogue in one piece of learning data 1011 are managed by the dialogue ID 143 and the time information 144.

The dialogue act information 145, the act information 146, and the property information 147 indicate a type of user's intention of an utterance indicated by the sentence 149, that is, a class of the sentence 149. More specifically, as shown in FIG. 3, the act information 146 indicates a class of an act meant by the sentence 149, such as "INI (initiative)", "FOL (follow)", "RES (response)", "QST (question)" and the like. The property information 147 indicates a class of a property indicated by the sentence 149, such as "RECOMMEND (recommendation)", "INFO (informing)", "ACK (acknowledgment)", and the like. The dialogue act information 145 indicates a class of a dialogue act meant by the sentence 149. In other words, the dialogue act information 145 indicates a meaning or a summary of the sentence 149 by a combination (for example, FOL_INFO) of act information 146 and property information 147 shown in FIG. 3. The dialogue act information 145, the act information 146, and the property information 147 are used, in learning, as training data of the sentence 149.

The speaker identification information 148 is information for identifying a speaker of the sentence 149.

For example, in the case of FIG. 3, the acquirer 111 acquires, as the training data 142 from the learning data 1011, the sentence 149 to be subjected to the learning by the learner 112 wherein the sentence 149 is associated with a dialogue ID 143, . . . , and speaker identification information 148. The acquirer 111 also acquires, as training data 142 from the learning data 1011, one or more sentences 149 at one or more time points in a set of previous time points within a continuous time range immediately previous to the first time point wherein the width of the time range is represented by a context window size, and at least speaker identification information 148 of a plurality of pieces of information associated to the sentences 149. The context window size is fixed. However, in a case where context information is so small that the context window size is not filled with context information as in the initial dialogue state, the context window size is set to be smaller than the fixed value.

For example, in a case where the context window size is 5 and the sentence 149 at a time point 5 is a sentence to be processed, the acquirer 111 acquires, as the training data 142, the sentence 149 at the time point 5 to which the dialogue ID 143, . . . , and the speaker identification information 148 are associated. The acquirer 111 acquires, as training data 142, sentences 149 at time points 0 to 4 in the set of previous time points, and speaker identification information 148 "Guide, Tourist, Guide, Tourist, Guide" at time points 0 to 4 in the set of previous time points. Note that the acquirer 111 has already acquired, as training data that indicates true values in the learning, dialogue act information 145 "FOL_ACK, FOL_POSITIVE", dialogue act information 146 "FOL", property information 147 "ACK, POSITIVE", associated with the sentence 149 at the time point 5.

In the above-described process, the acquirer 111 performs the extraction based on dialogue IDs 143 such that there is a discontinuation between different dialogues. Each time the extraction is performed, the acquirer 111 increments the first time point to extract training data 142.

Learner 112

The learner 112 makes the particular model learn three or more tasks at the same time using learning data. As one of tasks, the learner 112 makes the particular model learn the association between the first uttered sentence and act information using, as the training data, act information included in the learning data. Furthermore, as one of tasks, the learner 112 makes the particular model learn the association between the first uttered sentence and property information using, as the training data, property information included in the learning data. Furthermore, as one of tasks, the learner 112 makes the particular model learn the association between the first uttered sentence and dialogue act information using, as the training data, dialogue act information included in the learning data. Note that the particular model includes the first model having the first weight parameter, the second model having the second weight parameter, the third model having the third weight parameter, the fourth model having the fourth weight parameter, and the fifth model having the fifth weight parameter.

In the present embodiment, the learner 112 makes the particular model including two recurrent neural networks perform multi-task learning by machine learning using the learning data 1011 acquired by the acquirer 111. More specifically, the learner 112 makes the particular model perform learning at the same time in terms of the association between the sentence 149 to be learned and the act information 146, the association between the sentence 149 to be learned and the property information 147, and the association between the sentence 149 and the dialogue act information 145 using the context information and the language feature indicating importance levels of words included in the uttered sentence represented by the sentence 149 shown in FIG. 3. Note that the learner 112 may be realized, for example, by a processor such as a CPU, and ASIC, an FPGA, or the like and functions of the learner 112 may be accomplished by the processor by executing a computer-readable program stored in a computer.

Figure 4:
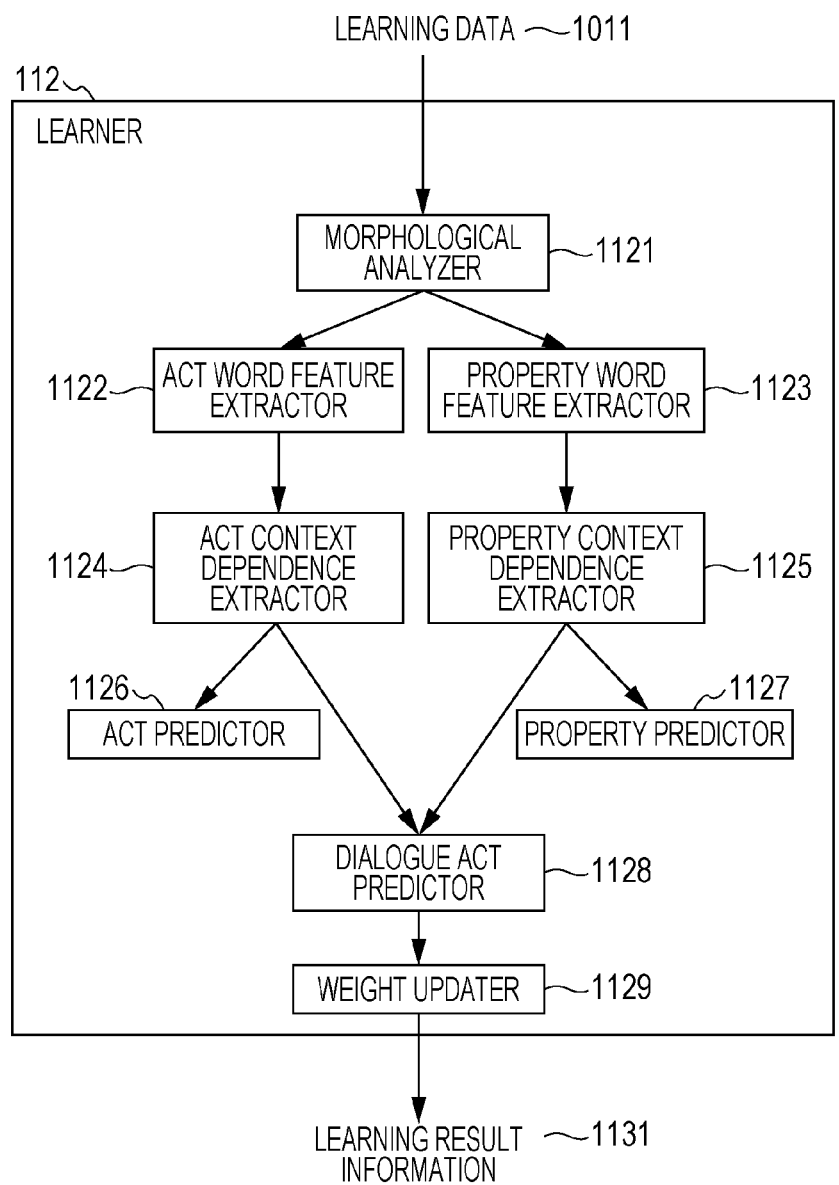
FIG. 4 is a block diagram illustrating an example of a detailed configuration of a learner according to the first embodiment.
Figure 5:
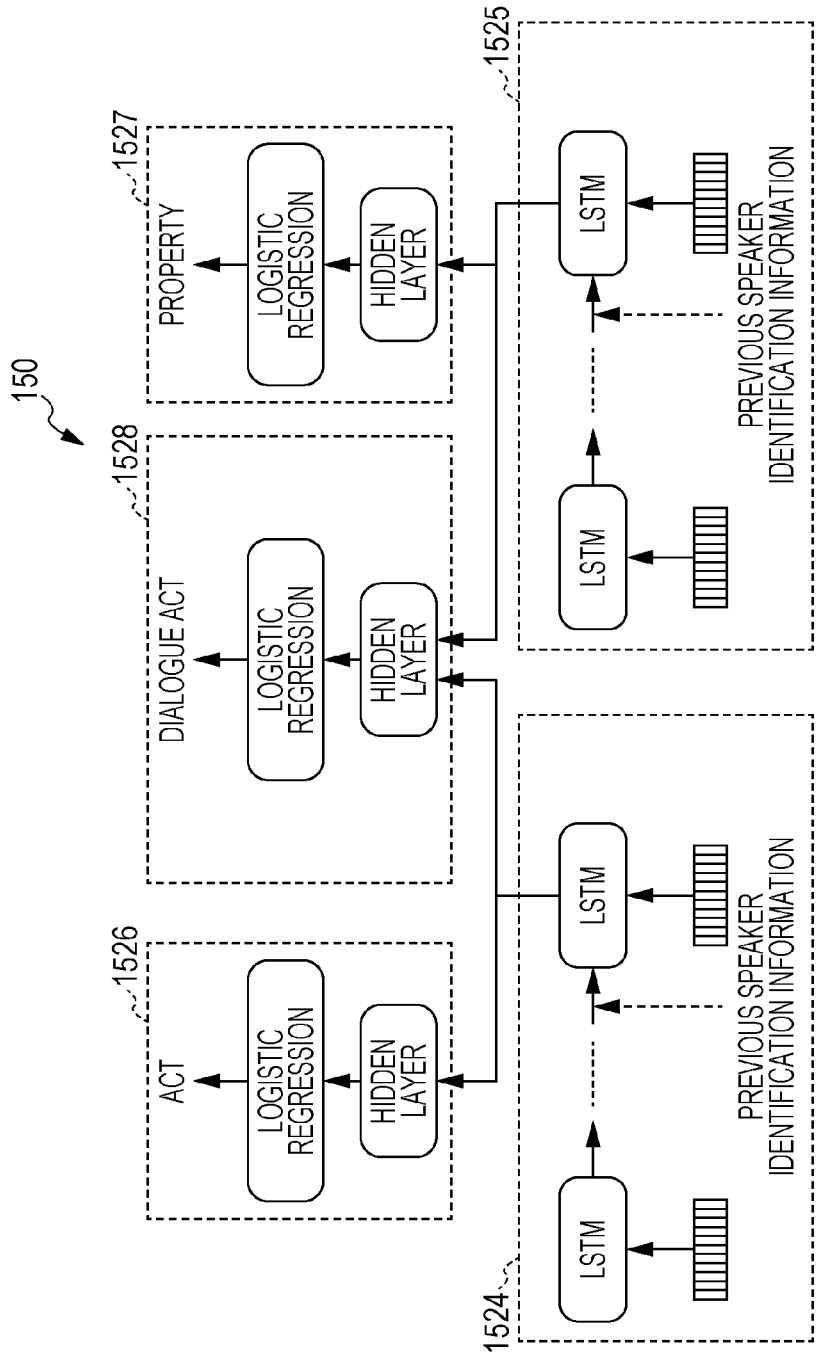
FIG. 5 is a diagram illustrating an outline of a neural network model according to the first embodiment.

FIG. 4 is a block diagram illustrating an example of a detailed configuration of the learner 112 according to the first embodiment. FIG. 5 is a diagram illustrating an outline of a neural network model 150 according to the first embodiment. Note that the neural network model 150 corresponds to the particular model described above.

The learner 112 includes, as shown in FIG. 4, a morphological analyzer 1121, an act word feature extractor 1122, a property word feature extractor 1123, an act context dependence extractor 1124, a property context dependence extractor 1125, an act predictor 1126, a property predictor 1127, a dialogue act predictor 1128, and a weight updater 1129.

Morphological Analyzer 1121

The morphological analyzer 1121 analyzes morphemes in an uttered sentence acquired by the acquirer 111 and converts the uttered sentence to a string of words represented by morphemes, wherein the morphemes are minimum units having meanings in a natural language. In the present embodiment, the morphological analyzer 1121 divides each of the sentences 149 at the first time point and at time points in the set of previous time points acquired by the acquirer 111 into words thereby converting each sentence 149 to a word string. For example, in a case where the uttered sentence is in Japanese, this process may be performed using morphological analysis software (for example, MeCab). For example, when the given sentence is "I have a headache,", the morphological analyzer 1121 divides the given sentence into "I", "have", "a", "headache", and ".". In a case wherein the uttered sentence is in English, the process may be performed by regarding spaces in each utterance as word delimiters.

Act Word Feature Extractor 1122

The act word feature extractor 1122 extracts a word feature for use in predicting act information based on the word string converted by the morphological analyzer 1121, and generates an act feature vector which is a sentence vector representation representing the extracted word feature. In the present embodiment, the act word feature extractor 1122 converts each of the word strings obtained by the morphological analyzer 1121 for the first time point and time points in the set of previous time points to an act feature vector representing a word feature for use in predicting act information.

One method of converting a word string to an act feature vector is to use a bag-of-words model in which the only concern is as to whether a sentence includes one or more words without taking into account the order of words. In the bag-of-words model, for example, when a sentence includes a word, a corresponding element of the vector has a value of 1, but otherwise the element has a value of 0. In the present embodiment, using the bag-of-words model, the act word feature extractor 1122 converts a given word string to an act feature vector based on, for example, a dictionary or a list of all words having a possibility of being input such that element values are equal to 1 only for elements corresponding to words or continuous words. Thus, the act feature vector has as many elements as there are words or continuous words in the dictionary, and each element has a value of 1 or 0 depending on whether a corresponding word or continuous words are included in the sentence.

The conversion method is not limited to the example described above. An alternative method is to perform, in advance, supervised learning using training data of acts, and extract words that occur frequently in an act thereby obtaining a vector expression.

Property Word Feature Extractor 1123

The property word feature extractor 1123 extracts a word feature for use in predicting property information, based on the word string converted by the morphological analyzer 1121, and generates a property feature vector which is a sentence vector representation indicating the extracted word feature. In the present embodiment, the property word feature extractor 1123 converts each of the word strings produced by the morphological analyzer 1121 for the first time point and time points in the set of previous time points to a property feature vector representing a word feature for use in predicting property information. The conversion may be performed using a bag-of-words model as in the example described above, or a method in which supervised learning using training data of acts is performed in advance, and words that occur frequently in an act are extracted thereby obtaining a vector expression.

Act Context Dependence Extractor 1124

The act context dependence extractor 1124 generates a first feature vector, by using the first model, from the act feature vector or the like generated by the act word feature extractor 1122 such that the generated first feature vector indicates word features for use in predicting acts of a plurality of uttered sentences and a context related to words or the like occurring frequently around the word features.

In the present embodiment, the act context dependence extractor 1124 calculates a first feature vector using the first model included in the particular model based on the act feature vector at time points of the set of previous time points, the act feature vector at the first time point, the speaker identification information 148 at time points in the previous set of time points, and the first weight parameter such that the first feature vector indicates a context which is frequently used in predicting an act corresponding to the sentence 149 at the first time point.

The act context dependence extractor 1124 is realized by a model 1524 having the first weight parameter included in the neural network model 150 shown in FIG. 5. That is, the model 1524 corresponds to the first model included in the particular model, and outputs a first feature vector representing a word feature of an act meant by the first sentence and context information of this word feature based on the first sentence, the second sentence, the first speaker identification information, the second speaker identification information, and the first weight parameter. The model 1524 includes an RNN-LSTM (Recurrent Neural Network-Long Short Term Memory) having the first weight parameter dependent on the first speaker identification information and the second speaker identification information. For example, the model 1524 calculates the first feature vector from the sentence 149 at the first time point and the sentences 149 at time points in the set of previous time points according to an RNN-LSTM which is the time series neural network model having the first weight parameter dependent on the speaker identification information 148 at time points in the set of previous time points (previous speaker identification information in FIG. 5). By this model 1524, context information dependent on the sentence 149 at the first time point, which occurs frequently in predicting an act, is output as the first feature vector.

Property Context Dependence Extractor 1125

The property context dependence extractor 1125 generates second feature vector, using the second model, from the property feature vector or the like generated by the property word feature extractor 1123 such that the generated second feature vector indicates word features for use in predicting properties of a plurality of uttered sentences and a context related to words or the like occurring frequently around the word features.

In the present embodiment, the property context dependence extractor 1125 calculates a second feature vector using the second model included in the particular model based on the property feature vector at time points of the set of previous time points, the property feature vector at the first time point, the speaker identification information 148 at time points in the previous set of time points, and the second weight parameter such that the second feature vector indicates a context, which is frequently used in predicting a property corresponding to the sentence 149 at the first time point.

The property context dependence extractor 1125 is realized by a model 1525 having the second weight parameter included in the neural network model 150 shown in FIG. 5. That is, the model 1525 corresponds to the second model included in the particular model, and outputs the second feature vector representing context information on a word feature associated with a property indicated by the first sentence and representing context information associated with the word feature based on the first sentence, the second sentence, the first speaker identification information, the second speaker identification information, and the second weight parameter. The model 1525 includes a second RNN-LSTM having the second weight parameter dependent on the first speaker identification information and the second speaker identification information. For example, the model 1525 calculates the second feature vector from the sentence 149 at the first time point and the sentences at time points in the set of the previous time points according to an RNN-LSTM, which is a time series neural network model, having the second weight parameter dependent on the speaker identification information 148 at the time points in the set of previous time points. By this model 1525, context information dependent on the sentence 149 at the first time point, which occurs frequently in predicting a property is output as the second feature vector.

Act Predictor 1126

The act predictor 1126 predicts, using the third model, an act for an uttered sentence subjected to the learning based on the first feature vector calculated by the act context dependence extractor 1124 and the third weight parameter.

In the present embodiment, using the third model included in the particular model, the act predictor 1126 calculates the posterior probability indicating the probability distribution for the sentence 149 at the first time point based on the first feature vector calculated by the act context dependence extractor 1124 and the third weight parameter.

The act predictor 1126 is realized by a model 1526 having the third weight parameter included in the neural network model 150 shown in FIG. 5. That is, the model 1526 corresponds to the third model included in the particular model, and outputs a posterior probability of an act corresponding to the first sentence based on the feature vector and the third weight parameter. More specifically, as shown in FIG. 5, the model 1526 realizes the calculation of the posterior probability by using multinomial logistic regression. That is, the model 1526 calculates the posterior probability of the act corresponding to the sentence 149 based on the first feature vector and the third weight parameter, and outputs the calculated posterior probability.

Property Predictor 1127

The property predictor 1127 predicts, using the fourth model, a property for the uttered sentence subjected to the learning based on the second feature vector calculated by the property context dependence extractor 1125 and the fourth weight parameter.

In the present embodiment, the property predictor 1127 calculates, using the fourth model included in the particular model, the posterior probability indicating the probability distribution for the sentence 149 uttered at the first time point based on the second feature vector calculated by the property context dependence extractor 1125 and the fourth weight parameter.

The property predictor 1127 is realized by a model 1527 having the fourth weight parameter included in the neural network model 150 shown in FIG. 5. That is, the model 1527 corresponds to the fourth model included in the particular model, and outputs a posterior probability of a property for the first sentence based on the second feature vector and the fourth weight parameter. The model 1527 realizes the calculation of the posterior probability by using multinomial logistic regression. That is, the model 1527 calculates the posterior probability of the property corresponding to the sentence 149 based on the second feature vector and the fourth weight parameter, and outputs the calculated posterior probability.

Dialogue Act Predictor 1128

The dialogue act predictor 1128 predicts, using the fifth model, a dialogue act for an uttered sentence subjected to the learning based on the first feature vector calculated by the act context dependence extractor 1124, the second feature vector calculated by the property context dependence extractor 1125, and the fifth weight parameter.

In the present embodiment, the dialogue act predictor 1128 predicts, using the fourth model included in the particular model, a posterior probability indicating a probability distribution of a dialogue act for the sentence 149 uttered at the first time point, based on the first feature vector calculated by the act context dependence extractor 1124, the second feature vector calculated by the property context dependence extractor 1125, and the fifth weight parameter.

The dialogue act predictor 1128 is realized by a model 1528 having the fifth weight parameter included in the neural network model 150 shown in FIG. 5. That is, the model 1528 corresponds to the fifth model included in the particular model, and outputs the posterior probability of the dialogue act corresponding to the first sentence based on the first feature vector, the second feature vector, and the fifth weight parameter. The model 1528 realizes the calculation of the posterior probability by using multinomial logistic regression. That is, the model 1528 calculates the posterior probability of the dialogue act corresponding to the sentence 149 uttered at the first time point based on the first feature vector, the second feature vector, and the fifth weight parameter.

Weight Updater 1129

The weight updater 1129 updates weight parameters such that based on errors of the posterior probability of the act corresponding to the first sentence, the posterior probability of the property corresponding to the first sentence, and the posterior probability of the dialogue act corresponding to the first sentence relative to the dialogue act information included in the learning data, the act information, and the property information, updating of the first weight parameter, the second weight parameter, the third weight parameter, the fourth weight parameter, and the fifth weight parameter is performed using an error backpropagation method thereby making the particular model learn three or more tasks at the same time using learning data.

In the present embodiment, the weight updater 1129 updates the first to fifth weight parameters of the models 1524 to 1528 to proper values such that the posterior probability of the act calculated by the act predictor 1126, the posterior probability of the property calculated by the property predictor 1127, and the posterior probability of the dialogue act calculated by the dialogue act predictor 1128 are equal to the true values of the dialogue act, the act, and the property indicated by the training data.

More specifically, the weight updater 1129 updates the weight parameters described above based on a prediction error between the posterior probability of the dialogue act and the true value of the dialogue act, a prediction error between the posterior probability of the act and the true value of the act, and a prediction error between the posterior probability of the property and the true value of the property. That is, the weight updater 1129 updates the first to fifth weight parameters, that is, the learning parameters, such that the errors (the differences) between the posterior probabilities of the dialogue act, the act, and the property and true values of the dialogue act, the act, and the property are minimized.

In the manner described above, the learner 112 performs the error backpropagation learning between the posterior probabilities of the dialogue act, the act, and the property and true values of the dialogue act, the act, and the property indicated by the learning data 1011 thereby making the particular model perform the multi-task learning on three or more tasks at the same time.

Neural Network

A learning process performed by the learner 112 using the neural network model 150 shown in FIG. 5 is described below. The neural network model 150 shown in FIG. 5 includes the models 1524 to 1528, and is used, as described above, by the act context dependence extractor 1124, the property context dependence extractor 1125, the act predictor 1126, the property predictor 1127, and the dialogue act predictor 1128.

The model 1524 corresponds to the first model described above, and is used by the act context dependence extractor 1124. The model 1525 corresponds to the second model described above, and is used by the property context dependence extractor 1125. The model 1524 and the model 1525 each include a recurrent neural network (LSTM). The recurrent neural network is suitable for processing time-series data. Among many types of recurrent neural networks, an LSTM (Long Short Term Memory) has an advantageous feature that it becomes possible to learn a long-term dependency by providing a module called a storage unit.

The model 1526 corresponds to the third model described above, and is used by the act predictor 1126. The model 1527 corresponds to the fourth model described above, and is used by the property predictor 1127. The model 1528 corresponds to the fifth model described above, and is used by the dialogue act predictor 1128. The model 1526, the model 1527, and the model 1528 each include a logistic regression and a hidden layer.

The neural network model 150 is used to minimize an error represented by formula (1) shown below.

$$L(\theta) = L_{main}(\theta_{main}) + L_{sub1}(\theta_{sub1}) + + L_{sub2}(\theta_{sub2}) \qquad (1)$$

In formula (1), $L_{main}(\theta_{main})$ indicates the prediction error of the dialogue act, $L_{sub1}(\theta_{sub1})$ indicates the prediction error of the act, and $L_{sub2}(\theta_{sub2})$ indicates the prediction error of the property. $\theta_{sub1}$ indicates the first weight parameter of the model 1524 and the third weight parameter of the model 1526, and $\theta_{sub2}$ indicates the second weight parameter of the model 1525 and the fourth weight parameter of the model 1527, $\theta_{main}$ indicates all learning parameters of the neural network model 150.

As for each prediction error, a cross-entropy error described by formula (2) shown below is used.

$$L_i(\theta_i) = -\Sigma_{t=1}^{N} \Sigma_{k=1}^{Ki} \{y_{tk} \log p_{tk} + (1-y_{tk})\log(1-p_{tk})\} \qquad (2)$$

In formula (2), $p_{tk}$ indicates the posterior probability of a k-th label of Ki labels subjected to the prediction for a t-th sentence 149 (at a first time point) in the N pieces of training data 142, $y_{tk}$ indicates the true value of the k-th label of Ki labels subjected to the prediction for the t-th sentence 149, and i indicates an element of {main, sub1, sub2}. That is, the label indicates the act and the property forming the dialogue act which is the combination of the act and the property. That is, formula (1) indicates the sum of prediction errors of the dialogue act, the act, and the property for all data, and the learner 112 updates $\theta_{main}$ using the error backpropagation method so as to minimize the prediction errors represented by formula (1).

A flow of a process performed in the neural network to determine each posterior probability is described below. First, in the LSTM, as described in formula (3) to formula (6) shown below, the feature vector x is multiplied by four weight matrices $W_i$, $W_c$, $W_f$, and $W_o$, and $h_{t-1}$ indicating a previous output from the LSTM is multiplied by weight matrices $H_i$, $H_c$, $H\sim_f$, and $H_o$, and then respective results thereof are added with bias terms $b_i$, $b_c$, $b_f$, and $b_o$. By putting these results as arguments in a sigmoid function, which is an activation function, four vectors $i_t$, $c\sim_t$, $f_t$, and $o_t$ having element values in a range from 0 to 1 are calculated. The vectors $i_t$, $c\sim_t$, $f_t$, and $o_t$ are for controlling the storage unit, and more specifically, the vectors $i_t$, $c\sim_t$, $f_t$, and $o_t$ respectively assume responsibility for storage input control, input memory cells, forgetting control, and storage output control.

$$i_t = \sigma(W^i x_t + H^i h_{t-1} + b^i) \qquad (3)$$

$$\tilde{c}_t = \sigma(W^c x_t + H^c h_{t-1} + b^c) \qquad (4)$$

$$f_t = \sigma(W^f x_t + H^f h_{t-1} + b^f) \qquad (5)$$

$$o_t = \sigma(W^o x_t + H^o h_{t-1} + b^o) \qquad (6)$$

Next, as shown below in formula (7), the learner 112 updates a value of a memory cell $c_t$ of the neural network based on the input control vector $i_t$, the input memory cell $c\sim_t$, the forget control vector $f_t$, and the previous memory unit value $c_{t-1}$.

$$c_t = i_t * \tilde{c}_t + f_t * c_{t-1} \qquad (7)$$

Next, the learner 112 calculates $h_t$ indicating an output from the LSTM at the first time point using the output control vector $o_t$ and the memory cell $c_t$ according to formula (8).

$$h_t = o_t * \tan h(c_t) \qquad (8)$$

In formula (8), t indicates a time point, represented by a position as counted from a past time point, in a time series of sentences 149 at times in the set of previous time points and at the first time point. Formula (9) represents a tan h function.

$$\tanh(a) = \frac{e^x - e^{-x}}{e^x + e^{-x}} \qquad (9)$$

The learner 112 performs the operation recursively until t=e is reached, that is, until the first time point of the dialogue act to be predicted is reached. Note that in the process described above, the act context dependence extractor 1124 uses the first weight parameter, and the property context dependence extractor 1125 uses the second weight parameter. That is, different weight parameters are used.

In particular, in the present embodiment, as shown below in formula (10), in the model 1524 and the model 1525 shown in FIG. 5, variables $H^i_{at-1}$, $H^c_{at-1}$, $H^f_{at-1}$, and $H^o_{at-1}$ dependent on previous speaker identification information are used in weight matrices $H_i$, $H_c$, $H_f$, and $H_o$ in formula (3) to formula (7). That is, a feature vector of a sentence 149 of a previous speaker is calculated using weight parameters which are different depending on an identification number of the speaker, and the resultant feature vector is recursively added to a feature vector of a sentence 149 of a next speaker. As a result, the speaker is distinguished, and a context is reflected in the output of the LSTM at the first time point at which the dialogue act is predicted.

$$H^{i,f,c,o} = H_{d-1}^{i,f,c,o} \qquad (10)$$

Next, processes performed by the models 1526, 1527, and 1528 shown in FIG. 5 are described below with reference to formula (11) shown below.

When an input vector x is given, the input vector x is multiplied by a weight matrix $W^{(1)}$ in a hidden layer, and the result thereof is added with a bias term $f^{(1)}$. Furthermore, a weight matrix $W^{(2)}$ is multiplied by logistic regression, and the result thereof is added with a bias term $b^{(2)}$. As a result, a vector of a plurality of probability values is obtained.

$$\text{Log } Reg(x) = \sigma(W^{(2)}\{\sigma(W^{(1)}x + b^{(1)})\} + b^{(2)}) \qquad (11)$$

Note that formula (11) provides a method of realizing in a neural network an approximation function for obtaining a probability distribution from a vector indicating a feature value.

Next, in the model 1526 shown in FIG. 5, $h_e^{sub1}$, output from the act context dependence extractor 1124 at the first time point, that is, at the time point t=e at which the dialogue act is to be predicted, is given as an input, and a vector of a plurality of probability values of acts is obtained using the third weight parameter according to formula (12) shown below. Note that each element of the resultant vector indicates a posterior probability of a property.

$$P(Y^{sub1} = Y_{tk} | x_{t-T}, \ldots, x_t; \theta_{sub1}) = \text{Log } Reg(h_e^{sub1}) \qquad (12)$$

Similarly, in the model 1527 shown in FIG. 5, $h_e^{sub2}$, output from the property context dependence extractor 1125 at the first time point, that is, at the time point t=e at which the dialogue act is to be predicted, is given as an input, a vector of a plurality of probability values of properties is obtained using the fourth weight parameter according to formula (13) shown below. Note that each element of the resultant vector indicates a posterior probability of a property.

$$P(Y^{sub2}=y_{tk}|x_{t-T}, \ldots, x_t; \theta_{sub2}) = \text{Log Reg}(h_e^{sub2}) \quad (13)$$

Next, in the model 1528 shown in FIG. 5, as described in formula (14) shown below, the feature vector $h_e^{sub1}$ determined by the act context dependence extractor 1124 and the feature vector $h_e^{sub2}$ determined by the property context dependence extractor 1125 are combined thereby obtaining $h_e^{main}$.

$$h_e^{main} = h_e^{sub1} \oplus h_e^{sub2} \quad (14)$$

Finally, in the model 1528 shown in FIG. 5, $h_e^{main}$ at the first time point, that is, at the time point t=e at which the dialogue act is to be predicted, is given as an input, and a vector of a plurality of probability values of dialogue acts is determined using the fifth weight parameter according to formula (15) shown below. Note that each element of the resultant vector indicates a posterior probability of a property.

$$P(Y^{sub2}=y_{tk}|x_{t-T}, \ldots, x_t; \theta_{main}) = \text{Log Reg}(h_e^{main}) \quad (15)$$

Note that in the process described above, the weight parameters are different for the act predictor 1126, the property predictor 1127, and the dialogue act predictor 1128.

In the manner described above, the posterior probability of the dialogue act is calculated by the neural network model 150 shown in FIG. 5.

Dialogue Act Estimation Apparatus 12

Next, details of the configuration of the dialogue act estimation apparatus 12 are described below.

The dialogue act estimation apparatus 12 includes, as shown in FIG. 1 or elsewhere, a dialogue acquirer 121, an estimator 122, and a storage 123.

Storage 123

The storage 123 stores, as an estimation result 1231, a result of estimation performed by the estimator 122. The storage 123 is realized, for example, using a rewritable non-transitory memory such as a hard disk drive, a solid state drive, or the like.

Dialogue Acquirer 121

The dialogue acquirer 121 acquires dialogue data including a third sentence in the form of text data of a third uttered sentence uttered at a second time point by a user, a fourth sentence in the form of text data of a fourth uttered sentence uttered at a time point immediately before the second time point, third speaker identification information indicating a speaker of the third sentence, and fourth speaker identification information indicating a speaker of the fourth sentence.

In the present example, the dialogue acquirer 121 acquires dialogue data 102. More specifically, the dialogue acquirer 121 acquires, as dialogue data, an uttered sentence at a time point of interest to be estimated and one or more uttered sentences at one or more time points in a set of previous time points within a continuous time range immediately previous to the current time point wherein the width of the time range is represented by a context window size. Note that the dialogue acquirer 121 may include, for example, a processor such as a CPU, an ASIC, an FPGA, or the like and the function of the dialogue acquirer 121 may be realized by executing, by the processor, a computer-readable program stored in a computer.

FIG. 6 is a diagram illustrating an example of dialogue data 102 according to the first embodiment.

The dialogue data 102 includes data of a plurality of uttered sentences uttered in a time-series order. In the example shown in FIG. 6, the dialogue data 102 includes data of a plurality of uttered sentences in a dialogue in terms of a tourist information in English.

More specifically, the dialogue data 102 includes uttered sentences 174 associated with time information 172 and speaker identification information 173. The dialogue data 102 includes a plurality of pieces of dialogue information 175 including one or more uttered sentences 174 associated with time information 172 and speaker identification information 173. In the example shown in FIG. 6, dialogue information 175 includes, by way of example but not limitation, two uttered sentences 174.

The uttered sentence 174 is text data of one uttered sentence representing a sentence of one utterance given by a user. In the example shown in FIG. 6, the uttered sentence 174 is character string data including English words separated by spaces. In a case where the uttered sentence 174 is text data of a Japanese sentence, the uttered sentence 174 may be character string data in which words are not separated. The time information 172 indicates a time point of the uttered sentence 174, that is, the time information 172 indicates an utterance order. That is, the time information 172 indicates the order in which plurality of uttered sentences 174 in the dialogue data 102 are uttered. The speaker identification information 173 is information for identifying a speaker of the uttered sentence 174.

In the example shown in FIG. 6, the dialogue data 102 has a context window size of 4 in which the second time point is a time point 4 and the set of previous time points includes a time point 0 to a time point 3. Guide, Tourist, Tourist, Tourist, and Guide are defined as speaker identification information 173 for respective time points 0 to 4.

The dialogue data 102 is generated, for example, based on a plurality of successive uttered sentences input from the outside. That is, first, successive uttered sentences are divided into a time series of uttered sentences thereby generating a plurality of uttered sentences 174. For example, in a case where successive uttered sentences are input by a text chat system, the successive uttered sentences are divided in units of text transmitted to a listener at a time thereby generating a plurality of uttered sentences 174. In a case where successive uttered sentences are input by a voice dialogue system, the uttered sentences may be divided into a plurality of uttered sentences 174 based on occurrences of continuous silent intervals that trigger speech recognition. Next, time information 172 and speaker identification information 173 are associated to each generated uttered sentence 174. The speaker identification information 173 may be generated using voiceprinting recognition or the like, or may be input from the outside.

Note that the dialogue data 102 is not limited to that stored in the storage apparatus 10 disposed outside the dialogue act estimation apparatus 12, but the dialogue data 102 may be generated by the dialogue act estimation apparatus 12 based on an uttered sentence uttered by a user and input from the outside. That is, the dialogue data 102 may be generated by the dialogue act estimation apparatus 12 or another apparatus.

As for the dialogue data 102, at least, successive past uttered sentences dependent on the context window size and a newly input current uttered sentence are held. When a new uttered sentence is input, an oldest past uttered sentence is discarded. The context window size is fixed. Preferably, the context window size may be set to be equal to the context window size of the training data 142 acquired by the acquirer 111 described above.

Estimator 122

The estimator 122 estimates a dialogue act for the third uttered sentence by applying dialogue data to the particular model in which learning result information 1131 stored in the learning process apparatus 11 has been reflected.

In the present embodiment, the estimator 122 estimates a dialogue act for an uttered sentence of interest using the particular model in which learning result information 1131 stored in the storage 113 has been reflected. The particular model is the same in structure as the neural network model 150 used in the learner 112. Note that the estimator 122 may be realized, for example, by a processor such as a CPU, and ASIC, an FPGA, or the like and functions of the estimation unit 122 may be accomplished by the processor by executing a computer-readable program stored in a computer.

FIG. 7 is a block diagram illustrating an example of a detailed configuration of the estimator 122 according to the first embodiment. In FIG. 7, similar elements to those shown in FIG. 1 or elsewhere are denoted by similar reference numerals.

The estimator 122 includes, as shown in FIG. 7, a morphological analyzer 1221, an act word feature extractor 1222, a property word feature extractor 1223, an act context dependence extractor 1224, a property context dependence extractor 1225, a dialogue act predictor 1226, and a dialogue act estimator 1227.

Morphological Analyzer 1221

The morphological analyzer 1221 analyzes morphemes in the uttered sentences included in the dialogue data 102 acquired by the dialogue acquirer 121 and converts the uttered sentences to a string of words represented by morphemes. In the present embodiment, based on the morphological analysis, the morphological analyzer 1221 divides, to words, each of the uttered sentences 174 at the time point of interest (the second time point) and times points in the set of previous time points included in the dialogue data 102 shown in FIG. 6 acquired by the dialogue acquirer 121.

The method of the morphological analysis may be similar to that described above.

Act Word Feature Extractor 1222

The act word feature extractor 1222 extracts a word feature for use in predicting act information, based on the word string converted by the morphological analyzer 1221, and generates an act feature vector representing the extracted word feature. In the present embodiment, the act word feature extractor 1222 converts each of the word strings at the second time point and time points in the set of previous time points produced by the morphological analyzer 1221 to an act feature vector which is a sentence vector representation representing a word feature for use in predicting act information.

The method of the conversion to the act feature vector may be similar to that described above.

Property Word Feature Extractor 1223

The property word feature extractor 1223 extracts a word feature for use in predicting property information based on the word string converted by the morphological analyzer 1221, and generates a property feature vector representing the extracted word feature. In the present example, the property word feature extractor 1223 converts each of the word strings produced by the morphological analyzer 1221 for the second time point and time points in the set of previous time points to a property feature vector representing a word feature for use in predicting property information.

The method of the conversion to the property feature vector may be similar to that described above.

Act Context Dependence Extractor 1224

The act context dependence extractor 1224 generates a first feature vector, by using the first model having been subjected to the learning, from the act feature vector or the like generated by the act word feature extractor 1222 such that the generated first feature vector indicates word features for use in predicting acts of a plurality of uttered sentences and a context related to words or the like occurring frequently around the word features. In the present embodiment, the act context dependence extractor 1224 calculates a third feature vector based on the act feature vector at time points of the set of previous time points, the act feature vector at the second time point, the speaker identification information 173 at time points of the set of the previous time points, and the first weight parameter having been subjected to the learning.

The act context dependence extractor 1224 is realized by a model 1524 having the first weight parameter having been subjected to the learning and included in the neural network model 150 shown in FIG. 5. That is, the model 1524 corresponds to the first model included in the particular model, and having the first weight parameter adjusted according to the learning result information 1131. In the act context dependence extractor 1224, context information, dependent on the uttered sentence 174 at the second time point which occurs frequently when an act is predicted, is output as the first feature vector using the model 1524 having been subjected to the learning.

The method of outputting the first feature vector using the model 1524 is similar to the above-described method except that the first weight parameter having been subjected to the learning is used.

Property Context Dependence Extractor 1225

The property context dependence extractor 1225 generates a second feature vector from the property feature vector and the like generated by the property word feature extractor 1223 by using the second model having been subjected to the learning such that the generated second feature vector indicates word features for use in predicting properties of a plurality of uttered sentences and a context related to words or the like occurring frequently around the word features. In the present embodiment, the property context dependence extractor 1225 calculates a fourth feature vector based on the property feature vector at time points of the set of previous time points, the property feature vector at the second time point, the speaker identification information 173 at time points of the set of previous time points, and the second weight parameter having been subjected to the learning.

The property context dependence extractor 1225 is realized by a model 1525 having the second weight parameter having been subjected to the learning and included in the neural network model 150 shown in FIG. 5. That is, the model 1525 corresponds to the second model included in the particular model, and having the second weight parameter adjusted according to the learning result information 1131. In the property context dependence extractor 1225, context information, dependent on the uttered sentence 174 at the second time point which occurs frequently when a property is predicted, is output as the fourth feature vector using the model 1525 having been subjected to the learning.

The method of outputting the second feature vector using the model 1525 is similar to the above-described method except that the second weight parameter having been subjected to the learning is used.

Dialogue Act Predictor 1226

The dialogue act predictor 1226 predicts, using the fifth model having been subjected to the learning, an act for an uttered sentence of interest based on the first feature vector calculated by the act context dependence extractor 1224, the second feature vector calculated by the property context dependence extractor 1225, and the fifth weight parameter having been subjected to the learning. In the present example, the dialogue act predictor 1226 calculates a posterior probability indicating a probability distribution of a dialogue act for the uttered sentence 174 at the second time point, based on the third feature vector calculated by the act context dependence extractor 1224, the fourth feature vector calculated by the property context dependence extractor 1225, and the fifth weight parameter having been subjected to the learning.

The dialogue act predictor 1226 is realized by a model 1528 having the fifth weight parameter having been subjected to the learning and included in the neural network model 150 shown in FIG. 5. That is, the model 1528 corresponds to the fifth model included in the particular model, and having the fifth weight parameter adjusted according to the learning result information 1131.

The method of calculating the fifth feature vector using the model 1528 is similar to the above-described method except that the fifth weight parameter having been subjected to the learning is used.

Dialogue Act Estimator 1227

The dialogue act estimator 1227 estimates a dialogue act based on the posterior probability of the dialogue act calculated by the dialogue act predictor 1226. The dialogue act estimator 1227 stores an estimation result 1231 indicating the estimated dialogue act in the storage 123. For example, the dialogue act estimator 1227 compares probability values of a plurality of dialogue acts indicated by posterior probabilities compared with a threshold value set to, for example, 0.5, thereby selecting dialogue acts having high probability values as the estimation result 1231.

FIG. 8 is a block diagram illustrating an example of an estimation result 1231 provided by the dialogue act estimation apparatus 12 according to the first embodiment. In FIG. 8, similar elements to those shown in FIG. 6 are denoted by similar reference numerals. In the example shown in FIG. 8, the estimation result 1231 is an estimation result for the dialogue data 102 shown in FIG. 6.

The estimation result 1231 includes, as shown in FIG. 8, unlike the dialogue data 102 shown in FIG. 6, dialogue acts 176 estimated for a plurality of uttered sentences 174 uttered in a time series order. The estimated dialogue acts 176 are estimation results obtained by the dialogue act estimator 1227 for dialogue acts for the uttered sentences 174.

In the example shown in FIG. 8, the acquired dialogue data 102 has a context window size of 4 in which the time point 4 is the second time point and the set of previous time points includes a time point 0 to a time point 3, and "RES_INFO" is obtained as the estimated dialogue act 176 at the second time point. In this example, by the act context dependence extractor 1224 and the property context dependence extractor 1225, "you can take" is extracted as an act which occurs frequently and "Station" is extracted as a property which occurs frequently, which results in a further increase in correct prediction probability. Furthermore, the learning of a combination between the first feature vector and the second feature vector by the dialogue act predictor 1226 makes it possible to avoid a partially-correct prediction such as "FOL_INFO (follow_informing)",

Operation of Dialogue Act Estimation System 1

The dialogue act estimation system 1 configured in the above-described manner operates as described below.

Figure 9:
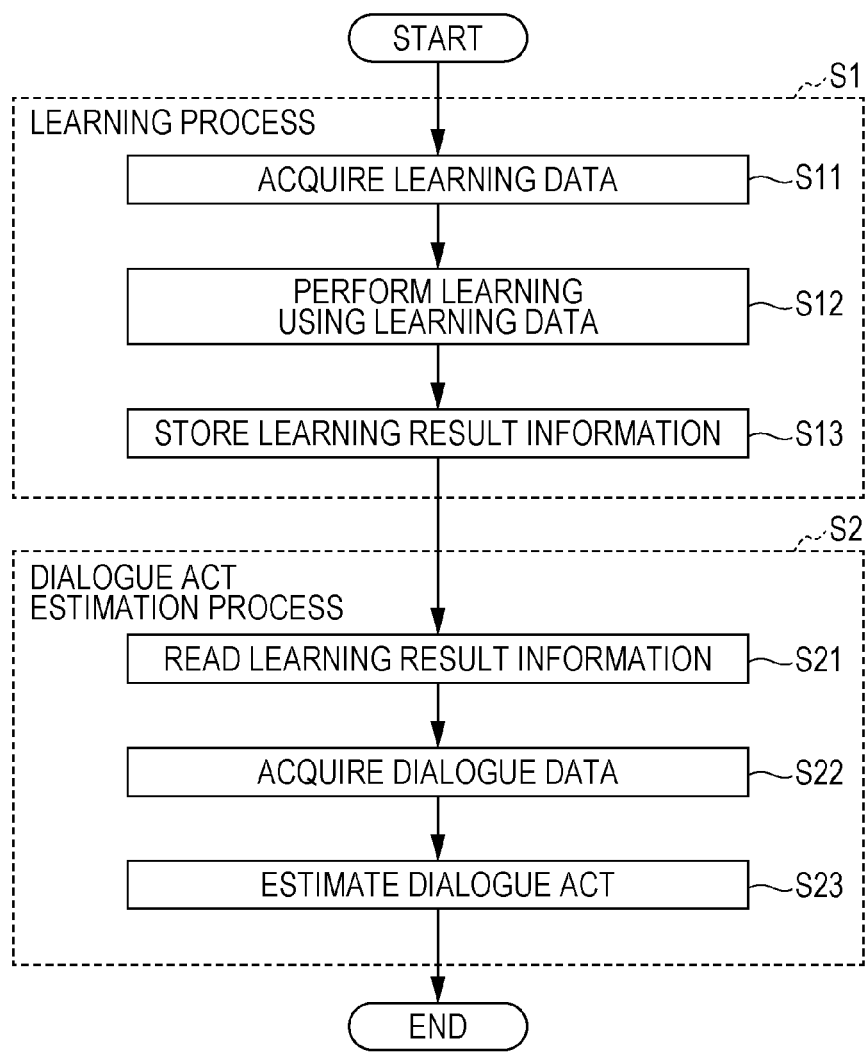
FIG. 9 is a flow chart illustrating an outline of an operation of a dialogue act estimation system according to the first embodiment.

FIG. 9 is a flow chart illustrating an outline of an operation of the dialogue act estimation system 1 according to the first embodiment. A specific example of a dialogue act estimation method according to the present disclosure includes part or all of a sequence of processes performed by the dialogue act estimation system 1 described below with reference to a flow chart shown in FIG. 9.

First, the dialogue act estimation system 1 performs a learning process to learn a correspondence between an uttered sentence and a dialogue act using training data 1011 included in the corpus 101 (S1). More specifically, in S1, first, the learning process apparatus 11 acquires learning data 1011 from the corpus 101 stored in the storage apparatus 10 (S11). Next, the learning process apparatus 11 performs multi-task learning in which the particular model used for estimating a dialogue act meant by an uttered sentence by using the learning data 1011 acquired in S11 is made to learn three or more tasks at the same time. (S12). The learning process apparatus 11 stores the learning result obtained in S12 as learning result information 1131 (S13).

Next, using the result of the learning process in S1, the dialogue act estimation system 1 performs a dialogue act estimation process to estimate a dialogue act for an uttered sentence (S2). More specifically, in S2, first, the dialogue act estimation apparatus 12 reads the learning result information 1131 which is the result of the learning process in S1 (S21), and the dialogue act estimation apparatus 12 reflects the learning result information 1131 in the particular model. Subsequently, the dialogue act estimation apparatus 12 acquires the dialogue data 102 stored in the storage apparatus 10 (S22). The dialogue act estimation apparatus 12 then estimates a dialogue act for an uttered sentence included in the dialogue data 102 by using the particular model in which the learning result information 1131 has been reflected (S23).

Operation of Learning Process Apparatus 11

Next, details of the learning process performed by the learning process apparatus 11 are described below.

Figure 10:
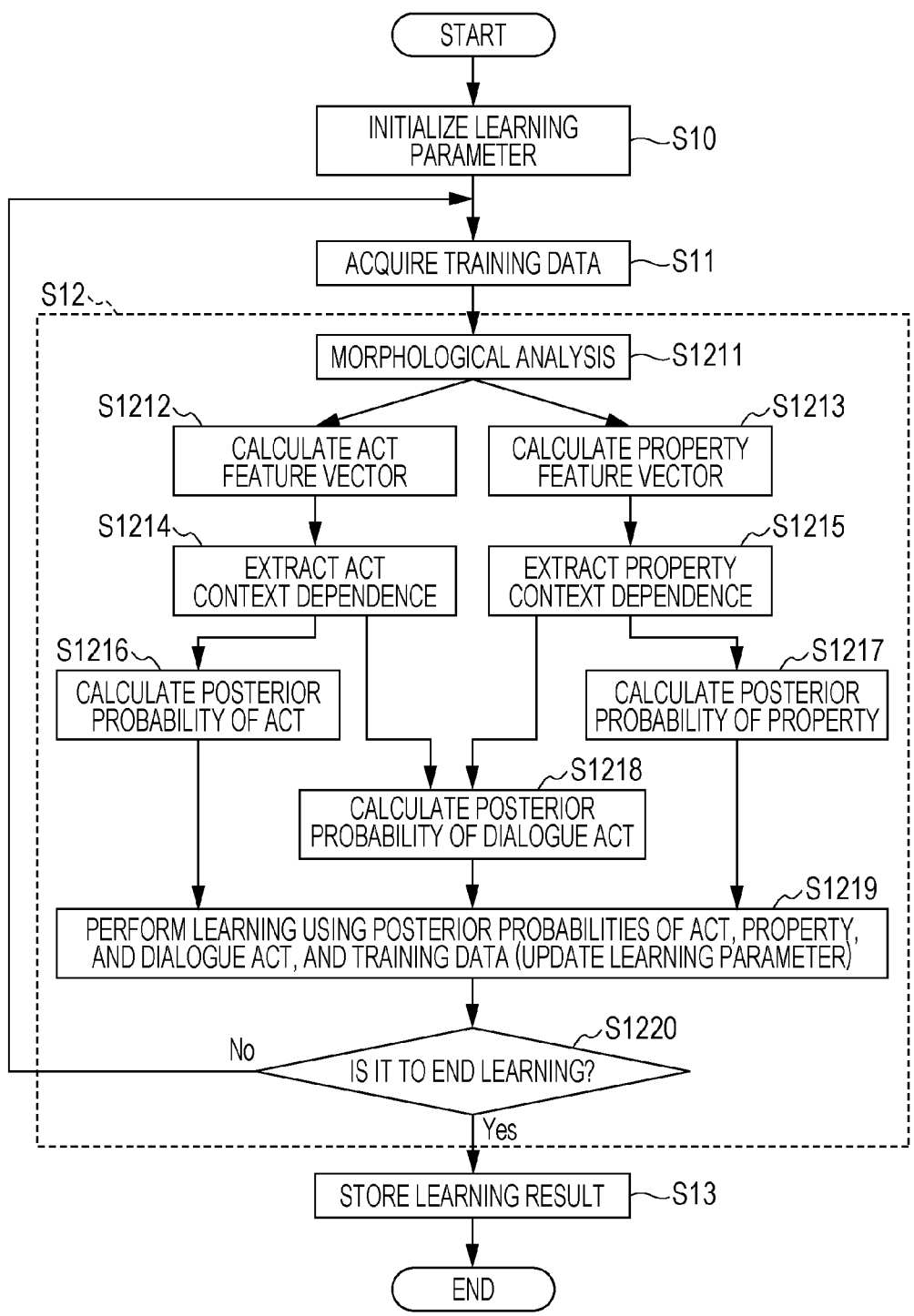
FIG. 10 is a flow chart illustrating a detailed learning process according to the first embodiment.

FIG. 10 is a flow chart illustrating a detailed learning process according to the first embodiment. In FIG. 10, similar elements to those shown in FIG. 9 are denoted by similar reference numerals. The example shown in FIG. 3 or elsewhere is used in the following explanation. A specific example of a dialogue act estimation method according to the present disclosure includes part or all of a sequence of processes performed by the learning process apparatus 11 described below with reference to a flow chart shown in FIG. 10.

First, the learning process apparatus 11 initializes all weight parameters to be learned, that is, learning parameters to be learned (S10). More specifically, the learning process apparatus 11 initializes first to fifth weight parameters of the neural network model 150 shown in FIG. 5 based on a pseudorandom number table.

Next, the learning process apparatus 11 acquires learning data 1011 (S11). More specifically, the learning process apparatus 11 acquires one of a plurality of pieces of learning data 1011 included in the corpus 101 stored in the storage apparatus 10.

Next, the learning process apparatus 11 performs learning using the learning data 1011 acquired in S11 (S12). More specifically, the learning process apparatus 11 uses, as training data, act information, property information, and dialogue act information included in the learning data 1011 acquired in S11. The learning process apparatus 11 makes the neural network model 150 shown in FIG. 5 learn an association between the first uttered sentence of interest and the act information, an association between the first uttered sentence and the property information, and an association between the first uttered sentence and the dialogue act information, based on the training data.

More specifically, as shown in FIG. 10, in S12, first, the learning process apparatus 11 performs morphological analysis on each of the sentences 149 at the first time point and at time points in the set of previous time points acquired in S11, divides each of the sentences 149 a word string according to the morphological analysis (S1211).

Subsequently, the learning process apparatus 11 converts each of the word strings obtained in S1211 for the first time point and time points in the set of previous time points to an act feature vector representing a word feature for use in predicting act information (S1212). Furthermore, the learning process apparatus 11 converts each of the word strings obtained in S1211 for the first time point and time points in the set of previous time points to a property feature vector representing a word feature for use in predicting property information (S1213).

Next, the learning process apparatus 11 calculates a first feature vector indicating a context, which is frequently used in predicting an act corresponding to the sentence 149 at the first time point, based on the act feature vectors at time points in the set of previous time points and the act feature vector at the first time point calculated in S1212, the speaker identification information 148 at time points in the previous set of time points, and the first weight parameter of the model 1524 (S1214). Furthermore, the learning process apparatus 11 calculates a second feature vector indicating a context, which is frequently used in predicting a property corresponding to the sentence 149 at the first time point, based on the property feature vectors at time points in the set of previous time points and the property feature vector at the first time point calculated in S1213, the speaker identification information 148 at time points in the previous set of time points, and the second weight parameter of the model 1525 (S1215).

Next, the learning process apparatus 11 calculates the posterior probability indicating the probability distribution of the act for the sentence 149 at the first time point based on the first feature vector calculated in S1214 and the third weight parameter of the model 1526 (S1216). Furthermore, the learning process apparatus 11 calculates the posterior probability indicating the probability distribution of the property of the sentence 149 at the first time point based on the second feature vector calculated in S1215 and the fourth weight parameter of the model 1527 (S1217).

Next, the learning process apparatus 11 calculates the posterior probability indicating the probability distribution of the act for the sentence 149 at the first time point based on the first feature vector calculated in S1214, the second feature vector calculated in S1215, and the fifth weight parameter of the model 1528 (31218).

Next, the learning process apparatus 11 performs learning using the posterior probability of the act calculated in S1216, the posterior probability of the property calculated in S1217, the posterior probability of the dialogue act calculated in S1218, and training data (S1219). Note that the training data indicates, as described above, a true value of a dialogue act for the dialogue act information 145 at the first time point, a true value of an act for the act information 146 at the first time point, and a true value of a property for the property information 147 at the first time point. That is, the learning process apparatus 11 updates the first to fifth weight parameters of the models 1524 to 1528, that is, learning parameters, to proper values by performing error backpropagation learning using the posterior probabilities of the act, the property, and the dialogue act calculated in S1216 to S1218 and training data thereof.

Next, the learning process apparatus 11 determines whether to end the learning process in S12 (31220). In a case where it is determined that the learning process 312 is not to be ended (No in S1220), the processing flow returns to S11 in which a time point following the first time point is employed as a new first time point, or another learning data 1011 is acquired, and then the learning process is performed in S12. That is, in the learning process apparatus 11, the learning process in S12 is performed repeatedly while changing the first time point or the learning data 1011 to be learned until convergence is achieved in the learning.

On the other hand, in a case where it is determined to end the learning process (Yes in S1220), the learning process apparatus 11 stores learning result information 1131 indicating a result of the learning process (313). More specifically, the learning process apparatus 11 stores learning parameters as of the end of the learning process as the learning result information 1131. Note that the learning process apparatus 11 makes the determination such that in a case where the repetition of learning does not result in a further reduction in the error, the learning process apparatus 11 determines that the learning process is to be ended.

Operation of Dialogue Act Estimation Apparatus 12

Next, details of the dialogue act estimation performed by the dialogue act estimation apparatus 12 are described below.

Figure 11:
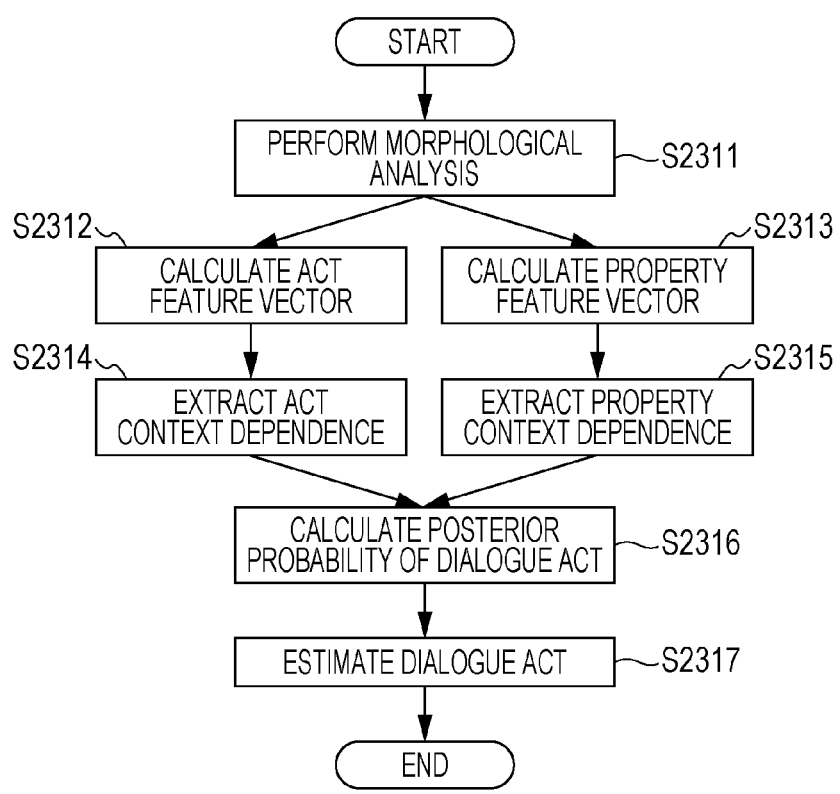
FIG. 11 is a flow chart illustrating details of a process S23 shown in FIG. 9.

FIG. 11 is a flow chart illustrating details of a process 323 shown in FIG. 9. In FIG. 11, similar elements to those shown in FIG. 9 are denoted by similar reference numerals. The example shown in FIG. 6 or elsewhere is used in the following explanation. A specific example of a dialogue act estimation method according to the present disclosure includes part or all of a sequence of processes performed by the dialogue act estimation apparatus 12 described below with reference to a flow chart shown in FIG. 11.

In S23, the dialogue act estimation apparatus 12 estimates a dialogue act for an uttered sentence of interest using the neural network model 150 having the first to fifth weight parameters in which learning result information 1131 has been reflected.

More specifically, as shown in FIG. 11, in S23, first, the dialogue act estimation apparatus 12 performs morphological analysis on each uttered sentence 174 of interest at the second time point and at time points in the set of previous time points included in the dialogue data 102 acquired in S22, and divides each uttered sentence 174 into a word string based on a result of the morphological analysis (S2311).

Subsequently, the dialogue act estimation apparatus 12 converts each of the word strings obtained in S2311 for the second time point and time points in the set of previous time points to an act feature vector representing a word feature for use in predicting act information (S2312). Furthermore, the dialogue act estimation apparatus 12 converts each of the word strings obtained in S2311 for the second time point and time points in the set of previous time points to a property feature vector representing a word feature for use in predicting property information (S2313).

Subsequently, the dialogue act estimation apparatus 12 calculates a first feature vector based on the act feature vectors at time points in the set of previous time points and the act feature vector at the second time point calculated in S2312, the speaker identification information 173 at time points of the set of the previous time points, and the first weight parameter of the model 1524 such that the first feature vector indicates a context, which is frequently used in predicting an act corresponding to the uttered sentence 174 at the second time point (S2314). Furthermore, the dialogue act estimation apparatus 12 calculates a second feature vector based on the property feature vectors at time points in the set of previous time points and the property feature vector at the second time point calculated in S2313, the speaker identification information 173 at time points of the set of the previous time points, and the second weight parameter of the model 1525 having been subjected to the learning such that the second feature vector indicates a context, which is frequently used in predicting a property corresponding to the uttered sentence 174 at the second time point (S2315).

Subsequently, the dialogue act estimation apparatus 12 calculates a posterior probability indicating a probability distribution of a dialogue act corresponding to the uttered sentence 174 at the second time point based on the first feature vector calculated in S2314, the second feature vector calculated in S2315, and the fifth weight parameter of the model 1528 having been subjected to the learning (S2316).

Subsequently, the dialogue act estimation apparatus 12 estimates the dialogue act corresponding to the uttered sentence 174 at the second time point based on the posterior probability of the dialogue act obtained in S2316 (S2317). The dialogue act estimation apparatus 12 stores an estimation result 1231 indicating the estimated dialogue act.

Note that the sequence of processes shown in FIG. 11 is performed sequentially for respective uttered sentences 174 at successive time points included in the dialogue data 102.

Effects

In the present embodiment, as descried above, two RCNN's are used such that one is for an act and the other one is for a property. Using these two RCNN's, tasks of extracting dependence of act on context and dependence of property on context are learned and at the same time a task of combining features thereof is learned. Thus the dialogue act estimation method and the dialogue act estimation apparatus based on this technique is capable of providing an improved accuracy in estimating a dialogue act.

More specifically, in the present embodiment, for a dialogue act of an uttered sentence of interest at the first time point subjected to learning, multi-task learning is performed using act information, property information, and dialogue act information, which is a combination of act information and property information, associated with a sentence indicating the uttered sentence of interest. For example, learning is performed using act information 146 indicating a type of an act represented by a sentence 149 shown in FIG. 3, property information 147 indicating a type of a property represented by the sentence 149, and dialogue act information 145 represented by the sentence 149 where the dialogue act information 145 is a combination of the act information 146 and the property information 147. A specific example of the dialogue act information 145 is FOL_INFO. This allows an increase in accuracy in associating an uttered sentence with dialogue act information. Note that it is possible to achieve a further improvement in accuracy by separately collecting act information and property information for sentences of uttered sentences at the first time point.

It is possible to achieve a further improvement in accuracy of associating dialogue act information to an uttered sentence by further using, in the learning, speaker identification information indicating a speaker of each uttered sentence of a plurality of uttered sentences.

The learning may further use speaker change information indicating whether a speaker of a sentence of interest at a first time point is the same as the speaker of a sentence immediately before the sentence at the first time point, as well as speaker identification information indicating a speaker of each sentence. This allows an increase in accuracy in associating an uttered sentence with dialogue act information.

FIG. 12 is a diagram illustrating an effect achieved by a dialogue act estimation method according to the first embodiment. More specifically, FIG. 12 illustrates a result of a dialogue act estimation for a case where learning parameters of the neural network model 150 shown in FIG. 5 are learned using a dialogue corpus (DSTC4) including 14 sets of English dialogue data in terms of tourist information where each set includes 100 to 1000 dialogues. In FIG. 12, to show a comparative example, a result of a dialogue act estimation is also illustrated for a case where the learning is performed according to the method disclosed in Nal Kalchbrenner, Phil Blunsom, "Recurrent Convolutional Neural Networks for Discourse Compositionality", arXiv preprint arXiv: 1306.3584, 2013.

As illustrated in FIG. 12, in classification accuracy (F1 value) in terms of 88 dialogue acts including 4 acts and 22 properties, the estimation result according to the first embodiment was better for guides and tourists than achieved in the estimation result according to the technique disclosed in Nal Kalchbrenner, Phil Blunsom, "Recurrent Convolutional Neural Networks for Discourse Compositionality", arXiv preprint arXiv: 1306.3584, 2013.

Modifications

Figure 13:
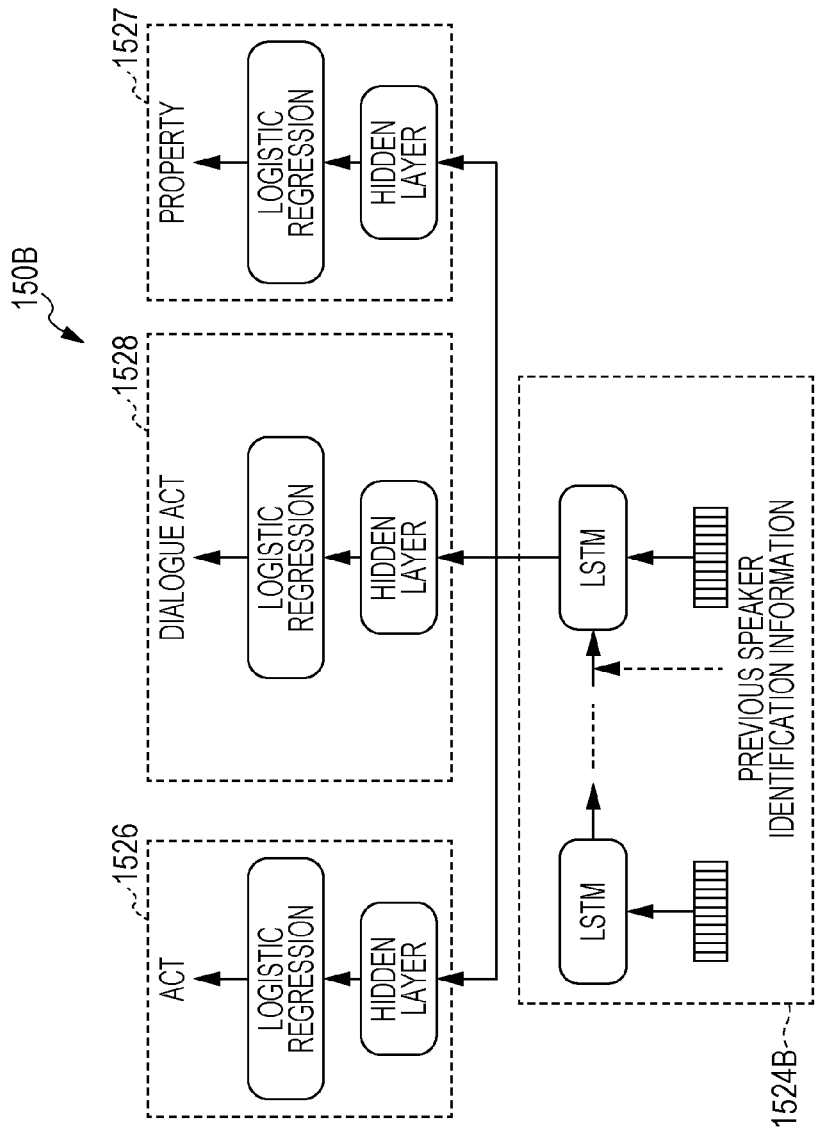
FIG. 13 is a diagram illustrating an outline of a neural network model according to a modification of the first embodiment.

FIG. 13 is a diagram illustrating an outline of a neural network model 150B according to a modification of the first embodiment. In FIG. 13, similar elements to those shown in FIG. 5 are denoted by similar reference numerals.

In the first embodiment described above, by way of example but not limitation, the neural network model 150 shown in FIG. 5 is used as the particular model in the learning process apparatus 11 and the dialogue act estimation apparatus 12. Alternatively, for example, a neural network model 150B shown in FIG. 13 may be used.

The neural network model 150B shown in FIG. 13 is different from the neural network model 150 shown in FIG. 5 in that only a model 1524B corresponding to the model 1524 is provided as opposed to the neural network model 150 in which both the model 1524 and the model 1525 are provided. That is, the difference in configuration is that the neural network model 150B shown in FIG. 13 includes only one recurrent neural network, while the neural network model 150 shown in FIG. 5 includes two recurrent neural networks.

The neural network model 150B is described below focusing on the difference from the first embodiment.

Learner 112B

A learner 112B makes a particular model learn three or more tasks at the same time using learning data as in the first embodiment. As one of tasks, the learner 112B makes the particular model learn the association between the first uttered sentence and act information using, as the training data, act information included in the learning data. As one of tasks, the learner 112B makes the particular model learn the association between the first uttered sentence and property information using, as the training data, property information included in the learning data. As one of tasks, the learner 112B makes the particular model learn the association between the first uttered sentence and dialogue act information using, as the training data, dialogue act information included in the learning data.

In the present modification, the particular model includes a first model having a first weight parameter, a third model having a third weight parameter, a fourth model having a fourth weight parameter, and a fifth model having a fifth weight parameter. The first model outputs a feature vector based on a first sentence, a second sentence, first speaker identification information, second speaker identification information, and the first weight parameter such that the feature vector representing a word feature in terms of an act and a property indicated by the first sentence and representing context information associated with the word feature. The first model includes an RNN-LSTM having the first weight parameter dependent on the first speaker identification information and the second speaker identification information. The third model outputs the posterior probability of an act corresponding to the first sentence based on the feature vector and the third weight parameter. The fourth model outputs the posterior probability of a property corresponding to the first sentence based on the feature vector and the fourth weight parameter. The fifth model outputs the posterior probability of a dialogue act corresponding to the first sentence based on the feature vector and the fifth weight parameter.

That is, in the learner 112B according to the present modification, based on errors of the posterior probability of the act corresponding to the first sentence, the posterior probability of the property corresponding to the first sentence, and the posterior probability of the dialogue act corresponding to the first sentence relative to the dialogue act information, the act information, and the property information included in the learning data, updating of the first weight parameter, the third weight parameter, the fourth weight parameter, and the fifth weight parameter is performed using an error backpropagation method thereby making the particular model perform the multi-task learning on three or more tasks at the same time using the learning data.

That is, the learner 112B makes the particular model including a single recurrent neural network perform multi-task learning using the learning data 1011 acquired by the acquirer 111. This particular model corresponds to the neural network model 150B shown in FIG. 13.

Figure 14:
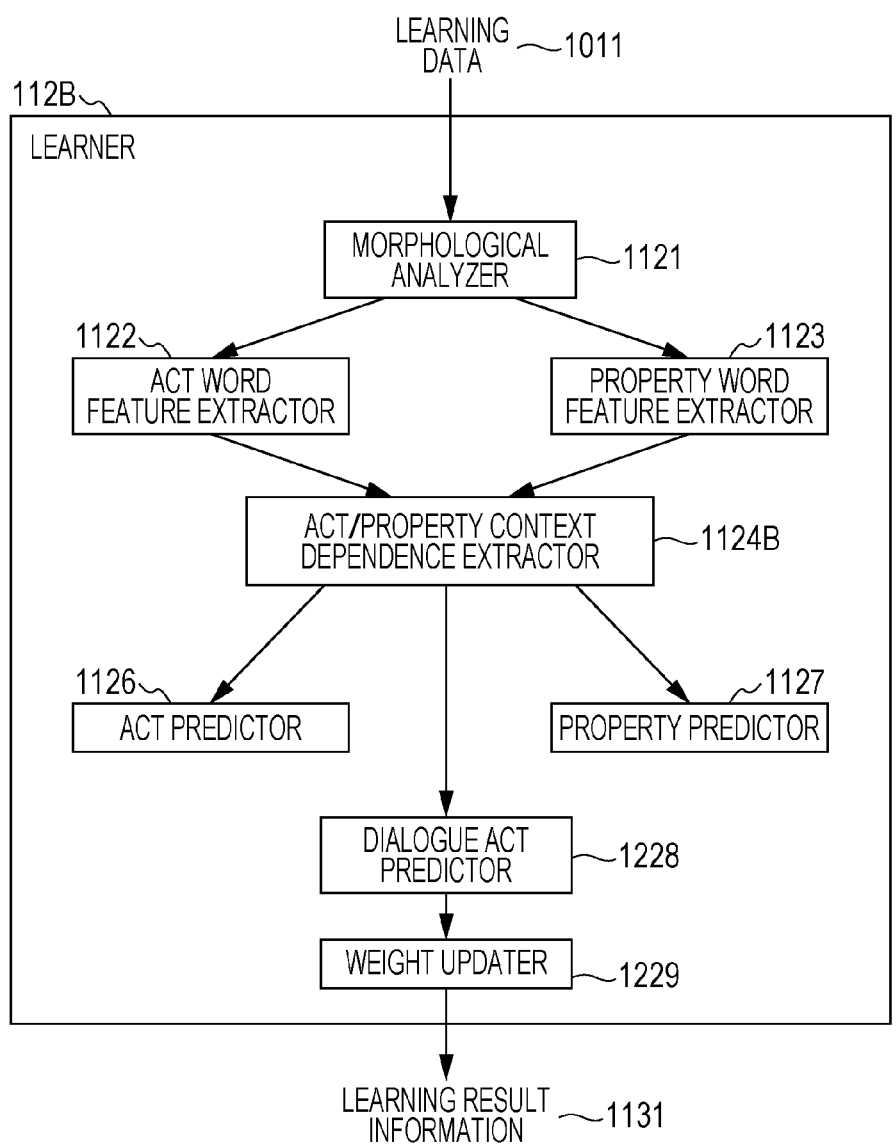
FIG. 14 is a block diagram illustrating an example of a detailed configuration of a learner according to a modification of the first embodiment.

FIG. 14 is a block diagram illustrating an example of a detailed configuration of the learner 112B according to the modification of the first embodiment. In FIG. 14, similar elements to those shown in FIG. 3 are denoted by similar reference numerals.

The learner 112B shown in FIG. 14 is different in configuration from the learner 112 shown in FIG. 3 in that the act context dependence extractor 1124 and the property context dependence extractor 1125 are not provided but an act/property context dependence extractor 1124B is added.

Act/Property Context Dependence Extractor 1124B

The act/property context dependence extractor 1124B generates a feature vector, using the first model, from the act feature vector generated by the act word feature extractor 1122 and the property feature vector generated by the property word feature extractor 1123 or the like such that the feature vector indicates word features for use in predicting acts and properties of a plurality of uttered sentences and a context related to words or the like occurring frequently around the word features. The generating of the feature vector using the first model by the act/property context dependence extractor 1124B is equivalent to an operation of generating the first feature vector and the second feature vector, which are the same as each other, and obtaining a feature vector therefrom.

The act/property context dependence extractor 1124B is realized by a model 1524B having the first weight parameter included in the neural network model 150B shown in FIG. 13. That is, the model 1524B corresponds to the first model included in the particular model according to the modification, and outputs a feature vector representing a word feature in terms of an act and a property indicated by the first sentence and representing context information associated with the word feature based on the first sentence, the second sentence, the first speaker identification information, the second speaker identification information, and the first weight parameter. The model 1524B includes an RNN-LSTM having the first weight parameter dependent on the first speaker identification information and the second speaker identification information. For example, the model 1524B calculates the feature vector from the sentence 149 at the first time point and the sentences 149 at time points in the set of previous time points according to an RNN-LSTM which is a time series neural network model having the first weight parameter dependent on the speaker identification information 148 at time points in the set of previous time points (previous speaker identification information in FIG. 13). By this model 1524B, context information dependent on the sentence 149 at the first time point, which occurs frequently in predicting an act and a property, is output as the feature vector.

This can be realized by employing a single common weight parameter as the third weight parameter and the fourth weight parameter in formulae (1) to (15), and expressing $h_e^{sub1}$ output from the act context dependence extractor 1124, $h_e^{sub2}$ output from the property context dependence extractor 1125, and $h_e^{main}$ which is a combination of $h_e^{sub1}$ and $h_e^{sub2}$ such that all of these are represented by the same feature vector.

Estimator 122B

The estimator 122B estimates a dialogue act for an uttered sentence by applying dialogue data to the particular model in which learning result information 1131 obtained as a result of learning performed by the learner 112B has been reflected. In the present modification, the estimator 1228 estimates a dialogue act for an uttered sentence of interest using the neural network model 150B in which learning result information 1131 stored in the storage 113 has been reflected. Note that this neural network model 1508 is the same in structure as that used in the learner 112B.

FIG. 15 is a block diagram illustrating an example of a detailed configuration of the estimator 122B according to a modification of the first embodiment. In FIG. 15, similar elements to those shown in FIG. 7 or elsewhere are denoted by similar reference numerals.

The estimator 122B shown in FIG. 15 is different in configuration from the estimator 122 shown in FIG. 7 in that the act context dependence extractor 1224 and the property context dependence extractor 1225 are removed, and an act/property context dependence extractor 1224E is added.

Act/Property Context Dependence Extractor 1224E

The act/property context dependence extractor 1224B generates a feature vector from the act feature vector generated by the act word feature extractor 1222 and the property feature vector generated by the property word feature extractor 1223 or the like using the first model having been subjected to the learning such that the generated feature vector indicates a word feature for use in predicting and an act and a property for a plurality of uttered sentences and a context related to words or the like occurring frequently around the word feature.

The act/property context dependence extractor 1224B is realized by the model 1524E having the first weight parameter having been subjected to the learning and included in the neural network model 150B shown in FIG. 13.

The generating of the feature vector using the first model by the act/property context dependence extractor 1224B is equivalent to an operation of generating the first feature vector and the second feature vector, which are the same as each other, and obtaining a feature vector therefrom according to the first embodiment.

Effects

In the present modification, as described above, using a single RCNN, a task of extracting dependence of act on context and dependence of property on context and a task of combining features thereof are learned at the same time. Thus the dialogue act estimation method and the dialogue act estimation apparatus based on this technique are capable of providing improved accuracy in estimating a dialogue act.

Figure 16A:
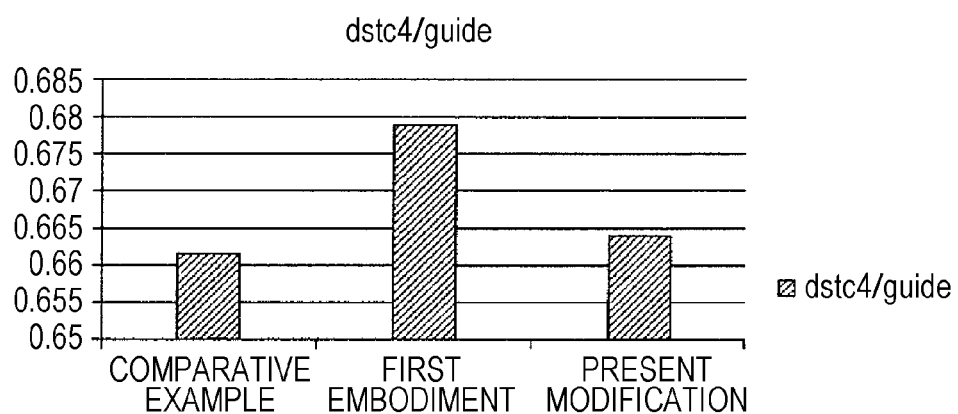
FIG. 16A is a diagram illustrating an effect achieved by a dialogue act estimation method according to a modification of the first embodiment.
Figure 16B:
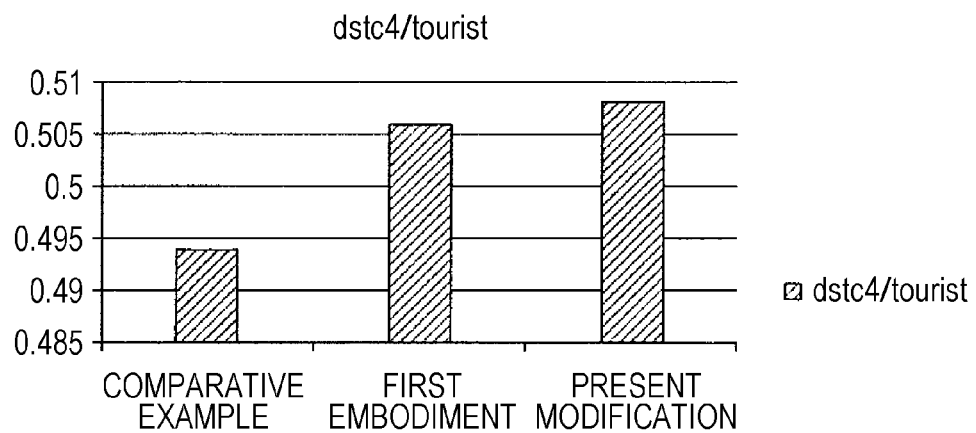
FIG. 16B is a diagram illustrating an effect achieved by a dialogue act estimation method according to a modification of the first embodiment.

FIG. 16A and FIG. 16B are diagrams each illustrating an effect achieved by the dialogue act estimation method according to a modification of the first embodiment. In FIG. 16A and FIG. 16B, a dialogue corpus (DSTC4) used herein includes 14 sets of English dialogue data in terms of tourist information where each set includes 100 to 1000 dialogues. More specifically, in FIG. 16A and FIG. 16B, a result of a dialogue act estimation is shown for a case where learning parameters of the neural network model 150B shown in FIG. 13 are learned using the dialogue corpus (DSTC4) in terms of tourist information. FIG. 16A and FIG. 16B show a comparative example, a result of a dialogue act estimation is also illustrated for a case where the learning is performed according to the method disclosed in Nal Kalchbrenner, Phil Blunsom, "Recurrent Convolutional Neural Networks for Discourse Compositionality", arXiv preprint arXiv: 1306.3584, 2013 as well as the dialogue act estimation obtained for the case where the learning is performed according to the first embodiment.

As shown in FIG. 16A and FIG. 16B, in classification accuracy (F1 value) in terms of 88 dialogue acts including 4 acts and 22 properties, the estimation result according to the present modification was better for guides and tourists than achieved in the estimation result according to the technique disclosed in Nal Kalchbrenner, Phil Blunsom, "Recurrent Convolutional Neural Networks for Discourse Compositionality", arXiv preprint arXiv: 1306.3584, 2013. Furthermore, the estimation result according to the present modification was better for tourists than achieved according to the first embodiment, because a greater amount of data is usable as training data in the dialogue corpus (DSTC4) in terms of tourist information than in the first embodiment.

Second Embodiment

In a second embodiment described below, a manner of using the dialogue act estimation apparatus 12 is disclosed.

Figure 17:
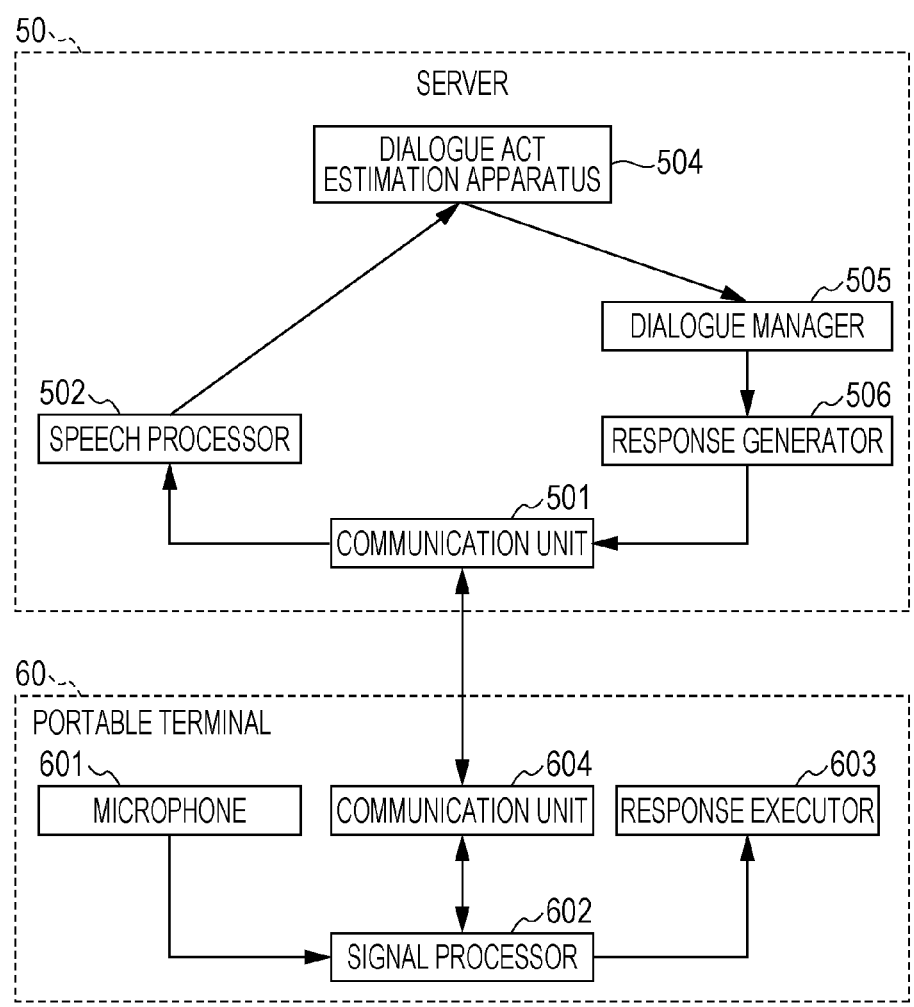
FIG. 17 is a block diagram illustrating an example of a configuration of a dialogue system according to a second embodiment.

FIG. 17 is a block diagram illustrating a dialogue system according to the second embodiment. This dialogue system has a speech recognition capability, and includes a server 50 located on a cloud and a portable terminal 60 such as a smartphone. A user is allowed to make a voice dialogue in a natural language with the system via the portable terminal 60. The server 50 and the portable terminal 60 are connected to each other, for example, via a public communication network such as the Internet.

The portable terminal 60 may be a smartphone, a tablet, or the like. The portable terminal 60 includes a microphone 601, a signal processor 602, a response executor 603, and a communication unit 604. The microphone 601 is a unit that converts a voice to an electric voice signal and is used to collect a voice of a user. The signal processor 602 determines whether a voice input from the microphone 601 is noise or not. In a case where the voice signal is not noise, the signal processor 602 outputs the voice signal to the communication unit 604. The communication unit 604 converts the input voice signal to a communication signal in a format so as to be allowed to be transmitted, and transmits the resultant communication signal to the server 50. The response executor 603 displays, on a monitor, a response sentence received by the signal processor 602 from the communication unit 604.

The server 50 includes a dialogue act estimation apparatus 12, a communication unit 501, a speech processor 502, a dialogue act estimation apparatus 504, a dialogue manager 505, and a response generator 506.

The communication unit 501 receives a communication signal from the portable terminal 60, extracts a voice signal from the communication signal, and outputs the extracted voice signal to the speech processor 502. The speech processor 502 analyzes the extracted voice signal and generates text data indicating a voice uttered by a user.

The dialogue act estimation apparatus 504 is, for example, the dialogue act estimation apparatus 12 shown in FIG. 2 and is in a state in which the learning process described above is already completed. The dialogue act estimation apparatus 504 generates the dialogue data 102 described above using text data generated by the speech processor 502, and estimates a dialogue act using the dialogue data 102 and outputs an estimation result.

The dialogue manager 505 holds, in a time-serial manner, dialogue acts estimated by the dialogue act estimation apparatus 504, and outputs a dialogue act of a response on the system side based on the series of dialogue acts. The response generator 506 generates a response sentence corresponding to the dialogue act received from the dialogue manager 505. The communication unit 501 converts the generated response sentence to a communication signal in a format capable of being transmitted, and transmits the resultant communication signal to the portable terminal 60.

In the dialogue system shown in FIG. 17, as described above, the server 50 is capable of correctly understanding an utterance of a user using the dialogue act estimation apparatus 504 in the state in which the learning according to the first embodiment is completed, and is capable of responding correctly.

The dialogue act estimation apparatus, the dialogue act estimation method, and related techniques have been described above with reference to the specific embodiments. However, the present disclosure is not limited to the embodiments described above.

Each of the processors in the dialogue act estimation apparatus according to any one of the embodiments described above may be typically implemented by an integrated circuit such as an LSI. The LSI may be individually formed as chips, or one chip may be formed so as to include a part or all of the processors.

However, the technique of implementing an integrated circuit is not limited to the LSI and may be realized by using a dedicated circuit or a general-purpose processor. An FPGA (Field Programmable Gate Array) that can be programmed after the manufacture of the LSI or a reconfigurable processor in which the connections and the settings of circuit cells disposed inside the LSI can be reconfigured may be used.

The present disclosure may be implemented as a dialogue act estimation method executed by a dialogue act estimation apparatus.

In each embodiment described above, each constituent element may be realized using dedicated hardware or may be realized by executing software program corresponding to the constituent element. Each constituent element may be realized by a program execution unit such as a CPU, a process or the like by reading software program stored in a storage medium such a hard disk, a semiconductor memory, or the like and executing the software program.

Note that the manners of dividing the meaning generation apparatus into functional blocks shown in block diagrams are merely examples. A plurality of functional blocks may be combined together into one functional block, or one functional block may be divided into a plurality of functional blocks. A part of function may be transferred to another functional block. Functions of a plurality of functional blocks having similar functions may be executed by single hardware or may be executed by software in parallel or in a time-sharing manner.

The orders of executing the steps described in flow charts are merely examples that may be employed to realize the present disclosure, and the order may be different from those employed in these examples. Part of the steps may be performed concurrently (in parallel) with other steps.

The dialogue act estimation apparatus according to one or more embodiments has been described above. However, the present disclosure is not limited to the embodiments described above. It will be apparent to those skilled in the art that many various modifications may be applicable to the embodiments without departing from the spirit and scope of the present disclosure. Furthermore, constituent elements of different embodiments may be combined. In this case, any resultant combination also falls within the scope of the present disclosure.

The present disclosure is applicable, for example, to a dialogue act estimation apparatus and a system that properly understands an utterance of a user based on a stored dialogue history of utterances in the form of a voice or text uttered by a user. For example, the present disclosure is usable in a call center to achieve a task of a user, or a task-oriented or non-task-oriented dialogue apparatus or a dialogue system in which an inquiry dialogue, a chat, or the like is performed. The present disclosure is usable in an information search apparatus or an information search system in which only a particular dialogue act is extracted from a dialogue history.

What is claimed is:

1. A dialogue act estimation method comprising:
acquiring learning data including a first sentence to be estimated in the form of text data of a first uttered sentence uttered at a first time point, a second sentence in the form of text data of a second uttered sentence, the second uttered sentence being uttered at a time point before the first time point, act information associated to the first sentence, property information associated to the first sentence, and dialogue act information indicating a dialogue act which is a combination of an act and a property associated to the first sentence, wherein the dialogue act information indicates a class of an act selected from the group consisting of INI(initiative) and FOL(follow);
making a particular model learn three or more tasks at the same time using the learning data; and
storing a result of the learning as learning result information in a memory,
wherein, in the making, the particular model is made to learn, as one of the three or more tasks, an association between the first uttered sentence and the act information using, as training data, the act information included in the learning data,
wherein, in the making, the particular model is made to learn, as one of the three or more tasks, an association between the first uttered sentence and the property information using, as training data, the property information included in the learning data,
wherein, in the making, the particular model is made to learn, as one of the three or more tasks, an association between the first uttered sentence and the dialogue act information using, as training data, the dialogue act information included in the learning data.

2. The dialogue act estimation method according to claim 1, wherein the learning data further includes first speaker identification information indicating a speaker of the first sentence and second speaker identification information indicating a speaker of the second sentence.

3. The dialogue act estimation method according to claim 2, wherein the particular model includes
a first model that outputs a first feature vector representing a word feature associated with an act meant by the first sentence and representing context information associated with the word feature based on the first sentence, the second sentence, the first speaker identification information, the second speaker identification information, and a first weight parameter,
a second model that outputs a second feature vector representing a word feature associated with a property indicated by the first sentence and representing context information associated with the word feature based on the first sentence, the second sentence, the first speaker identification information, the second speaker identification information, and a second weight parameter,
a third model that outputs a posterior probability of the act corresponding to the first sentence based on the first feature vector and a third weight parameter,
a fourth model that outputs a posterior probability of the property corresponding to the first sentence based on the second feature vector and a fourth weight parameter, and
a fifth model that outputs a posterior probability of the dialogue act corresponding to the first sentence based on the first feature vector, the second feature vector and a fifth weight parameter,
and wherein in the making, based on errors of the posterior probability of the act corresponding to the first sentence, the posterior probability of the property corresponding to the first sentence, and the posterior probability of the dialogue act corresponding to the first sentence relative to the dialogue act information, the act information, and the property information included in the learning data, updating of the first weight parameter, second weight parameter, the third weight parameter, the fourth weight parameter, and the fifth weight parameter is performed using an error backpropagation method, and the particular model is made to learn the three or more tasks at the same time using the learning data.

4. The dialogue act estimation method according to claim 3, wherein
the first model includes an RNN-LSTM (Recurrent Neural Network-Long Short Term Memory) having the first weight parameter dependent on the first speaker identification information and the second speaker identification information, and the second model includes a second RNN-LSTM having the second weight parameter dependent on the first speaker identification information and the second speaker identification information.

5. The dialogue act estimation method according to claim 2, wherein the particular model includes a first model that outputs a feature vector representing a word feature associated with an act and a property indicated by the first sentence and representing context information associated with the word feature based on the first sentence, the second sentence, the first speaker identification information, the second speaker identification information, and a first weight parameter, a third model that outputs a posterior probability of the act corresponding to the first sentence based on the feature vector and a third weight, a fourth model that outputs a posterior probability of the property corresponding to the first sentence based on the feature vector and a fourth weight, and a fifth model that outputs a posterior probability of the dialogue act corresponding to the first sentence based on the feature vector and a fifth weight, and wherein in the making, based on errors of the posterior probability of the act corresponding to the first sentence, the posterior probability of the property corresponding to the first sentence, and the posterior probability of the dialogue act corresponding to the first sentence relative to the dialogue act information, the act information, and the property information included in the learning data, updating of the first weight parameter, the third weight parameter, the fourth weight parameter, and the fifth weight parameter is performed using an error backpropagation method, and the particular model is made to learn the three or more tasks at the same time using the learning data.

6. The dialogue act estimation method according to claim 5, wherein the first model includes an RNN-LSTM having the first weight parameter dependent on the first speaker identification information and the second speaker identification information.

7. The dialogue act estimation method according to claim 1, wherein in the acquisition, the learning data is acquired from a corpus including a collection of two or more successive time-series uttered sentences each associated with act information, property information, and dialogue act information.

8. The dialogue act estimation method according to claim 2, further comprising:

acquiring dialogue data including a third sentence in the form of text data of a third uttered sentence uttered at a second time point by a user, a fourth sentence in the form of text data of a fourth uttered sentence uttered at a time point immediately before the second time point, third speaker identification information indicating a speaker of the third sentence, and fourth speaker identification information indicating a speaker of the fourth sentence; and estimating a dialogue act for the third uttered sentence by applying the dialogue data to the model in which the stored learning result information has been reflected.

9. The dialogue act estimation method according to claim 1, wherein at least one of the acquiring, the making and the storing is performed by a processor.

10. A dialogue act estimation apparatus comprising:
a processor configured to:
acquire learning data including a first sentence to be estimated in the form of text data of a first uttered sentence uttered at a first time point, a second sentence in the form of text data of a second uttered sentence, the second uttered sentence being uttered at a time point before the first time point, act information associated to the first sentence, property information associated to the first sentence, and dialogue act information indicating a dialogue act which is a combination of an act and a property associated to the first sentence, wherein the dialogue act information indicates a class of an act selected from the group consisting of INI(initiative) and FOL(follow); and cause a particular model to learn three or more tasks at the same time using the learning data; and a storage that stores a result of the learning as learning result information, wherein the processor is further configured to cause the particular model to learn, as one of the three or more tasks, an association between the first uttered sentence and the act information using, as training data, the act information included in the learning data, as one of the three or more tasks, an association between the first uttered sentence and the property information using, as training data, the property information included in the learning data, and as one of the three or more tasks, an association between the first uttered sentence and the dialogue act information using, as training data, the dialogue act information included in the learning data.

11. A non-transitory computer-readable recording medium storing a program, the program causing a computer to execute:

acquiring learning data including a first sentence to be estimated in the form of text data of a first uttered sentence uttered at a first time point, a second sentence in the form of text data of a second uttered sentence, the second uttered sentence being uttered at a time point before the first time point, act information associated to the first sentence, property information associated to the first sentence, and dialogue act information indicating a dialogue act which is a combination of an act and a property associated to the first sentence, wherein the dialogue act information indicates a class of an act selected from the group consisting of INI(initiative) and FOL(follow);

making a particular model learn three or more tasks at the same time using the learning data; and storing a result of the learning as learning result information in a memory, wherein, in the making, the particular model is made to learn, as one of the three or more tasks, an association between the first uttered sentence and the act information using, as training data, the act information included in the learning data, wherein, in the making, the particular model is made to learn, as one of the three or more tasks, an association between the first uttered sentence and the property information using, as training data, the property information included in the learning data, wherein, in the making, the particular model is made to learn, as one of the three or more tasks, an association between the first uttered sentence and the dialogue act information using, as training data, the dialogue act information included in the learning data.

* * * * *